United States Patent
Laubach et al.

[19]

[11] Patent Number: 6,028,860

[45] Date of Patent: Feb. 22, 2000

[54] PRIORITIZED VIRTUAL CONNECTION TRANSMISSIONS IN A PACKET TO ATM CELL CABLE NETWORK

[75] Inventors: Mark E. Laubach, Mountain View; Sanford L. Helton, San Jose; Alireza Raissinia, Monte Serino; Paul A. Gordon, Santa Clara; Michael J. Sabin, Sunnyvale; Malay M. Thaker, Campbell; Kathleen M. Nichols, Woodside, all of Calif.

[73] Assignee: COM21, Inc., Milpitas, Calif.

[21] Appl. No.: 08/731,958

[22] Filed: Oct. 23, 1996

[51] Int. Cl.[7] .......................... H04L 12/28; H04L 12/43; H04N 7/10; H04H 1/00

[52] U.S. Cl. .............................. 370/395; 370/461; 348/6; 348/13; 455/5.1

[58] Field of Search ................................... 370/395, 474, 370/475, 476, 478, 432, 442, 443, 444, 458, 461, 462; 348/6, 7, 10, 11, 12, 13, 14, 16, 17; 395/200.55, 200.37; 455/5.1; 709/207, 225

[56] References Cited

U.S. PATENT DOCUMENTS

| | | | |
|---|---|---|---|
| 3,668,307 | 6/1972 | Face et al. ................................ | 178/5.6 |
| 3,836,888 | 9/1974 | Boenke et al. ......................... | 340/172.5 |
| 3,859,596 | 1/1975 | Jannery et al. ............................ | 325/31 |
| 4,245,245 | 1/1981 | Matsumoto et al. ..................... | 358/122 |
| 4,398,289 | 8/1983 | Schoute .................................... | 370/93 |
| 4,528,663 | 7/1985 | Citta ......................................... | 370/94 |
| 4,533,948 | 8/1985 | McNamara et al. ..................... | 358/122 |
| 4,538,174 | 8/1985 | Gargini et al. ............................ | 358/86 |
| 4,623,920 | 11/1986 | Dufresne et al. ........................ | 358/122 |
| 4,633,462 | 12/1986 | Stifle et al. ................................ | 370/85 |
| 4,752,954 | 6/1988 | Masuko ..................................... | 380/20 |
| 4,920,533 | 4/1990 | Dufresne et al. ........................ | 370/85.2 |
| 5,012,469 | 4/1991 | Sardana .................................... | 370/95.3 |
| 5,034,882 | 7/1991 | Eisenhard et al. ....................... | 364/200 |
| 5,121,387 | 6/1992 | Gerhardt et al. ......................... | 370/85.2 |
| 5,255,086 | 10/1993 | McMullan, Jr. et al. ................. | 358/86 |
| 5,303,234 | 4/1994 | Kou ......................................... | 370/85.2 |
| 5,327,432 | 7/1994 | Zein Al Abdeen et al. ........... | 370/95.3 |
| 5,361,394 | 11/1994 | Shigihara ................................. | 455/5.1 |
| 5,420,858 | 5/1995 | Marshall et al. ......................... | 370/474 |
| 5,421,030 | 5/1995 | Baran ....................................... | 455/5.1 |
| 5,425,027 | 6/1995 | Baran ....................................... | 370/69.1 |
| 5,471,474 | 11/1995 | Grobicki et al. ......................... | 370/85.2 |
| 5,488,412 | 1/1996 | Majeti et al. ............................. | 348/10 |

(List continued on next page.)

FOREIGN PATENT DOCUMENTS

| | | | |
|---|---|---|---|
| 0730383A2 | 9/1996 | European Pat. Off. ....... | H04N 7/173 |

OTHER PUBLICATIONS

Laubach, "The Upstreams Protocol for HFC Networks", Oct. 23, 1995, IEEE, P802.14–95/152.

(List continued on next page.)

*Primary Examiner*—Chi H. Pham
*Assistant Examiner*—Steven Nguyen
*Attorney, Agent, or Firm*—Wagner Murabito & Hao LLP

[57] ABSTRACT

Bi-directional communications system in a CATV network utilizing cell-based Asynchronous Transfer Mode (ATM) transmissions. Packet data existing in any one of several different formats are first converted into ATM cells by a headend controller. Individual cells are then assigned a virtual connection by the headend controller. Based on the virtual connection, the cells can be prioritized and routed to their intended destinations. The cells are transmitted in a shared radio frequency spectrum over a standard cable TV network. A subscriber terminal unit demodulates the received RF signal and processes the cells for use in a computer. Likewise, computers may transmit packet data to their respective subscriber terminal units which are sent to the headend controller over the same CATV network. Hence, the present invention offers a flexible, effective, economic, and fully integrated multimedia bearer system granting immediate support for Internet services, traditional voice telephony, and digital video services over a CATV network.

30 Claims, 20 Drawing Sheets

U.S. PATENT DOCUMENTS

| | | | |
|---|---|---|---|
| 5,513,180 | 4/1996 | Miyake et al. | 348/7 |
| 5,517,502 | 5/1996 | Bestler et al. | 370/94.2 |
| 5,535,206 | 7/1996 | Bestler et al. | 370/79 |
| 5,539,449 | 7/1996 | Blahut et al. | 348/7 |
| 5,544,161 | 8/1996 | Bigham et al. | 370/58.1 |
| 5,572,517 | 11/1996 | Safadi | 370/50 |

OTHER PUBLICATIONS

Griefe et al., "Hybrid Network Bridge", Jun. 1992, IBM Technical Disclosure Bulletin, vol. 35 No. 1B.

Mollenauer et al., "Cable–TV Protocols for Metropolitan and Regional Communication Systems", Interoperability In Broadband Networks, IOS Press 1994.

Estrin, "Data Communications Via Cable Television Netwoks: Technical and Policy Considerations", 1982, Massachusetts Institute of Technology.

Sarraf et al., "Use of Hybrid Cars Microwave/Cable for Multisite Local–Area Networking", 1984, The National Cable Television Association.

Tunmann, "Data on Cable for Profit", 1982, Massachusetts Institute of Technology.

Ennis, "Design Considerations for Broadband Metropolitan Networks", Network Technology Group, Sytek USA.

Aukstikalnis, "Communicom, an Advanced Interactive Data Communications Data System", General Instrument Corporation, Hatboro, USA.

Walsh, Jr., "Timing Considerations in RF Two Way Data Collection and Polling", 1989, National Cable Television Association.

Dickinson, "Local Area Networks and Cable Television", 1986, National Cable Television Association.

Jain et al., "Technical Considerations of Two–Way Interactive CATV", 1985, National Cable Television Association.

Baran, "Packetable: A New Interactive Cable System Technology" 1982, National Cable Television Association.

McNamara, "MetroNet: An Overview of a CATV Regional Data Network" 1982, National Cable Television Association.

Karshmer et al., "Computer Networking on Cable TV Plants", Nov. 1992, IEEE Network, vol. 6 No. 6, p. 32.

Kong, "Cabnet: A Local Area Network", 1982, IEEE International Conference on Communications, vol. 3.

Feldmeier, "An Efficient Access Scheme for a CATV–Based High–Speed Packet–Switching Metropolitan Area Network", 1988, INFOCOMM '88.

Laubach, "To Foster Residential Area Broadband Internet Technology: IP Datagrams Keep Going, and Going, and Going", Computer Communications, vol. 19, No. 11, Sep. 1996.

Gobl et al., "ARIDEM—A Multi–Service Broadband Access Demonstrator", Ericsson Review, vol. 73, No. 3, 1996.

PRIORITIZED VIRTUAL CONNECTION TRANSMISSIONS IN A PACKET TO ATM CELL CABLE NETWORK

FIELD OF THE INVENTION

The present invention pertains to high-speed broadband communications delivered over a shared media network. More particularly, the present invention relates to bi-directional transmission of packet to ATM cell based communications between a head-end communication controller and a plurality of subscriber terminal units whereby individual cells are prioritized and routed according to a virtual connection.

BACKGROUND OF THE INVENTION

Due to the proliferation of personal computers, the widespread acceptance of the Internet, and the advent of the Information Age, there is a virtual explosion in the amount of digital data transmissions. Currently, one common method for transmitting and receiving digital data involves the use of telephone modems. A telephone modem is used to transmit digital data generated by a computer to an intended destination over standard telephone lines. The same modem also can receive digital data from a telephone line. This setup enables computers to gain access to the Internet and other on-line services over standard telephone jacks. Although this form of communications is convenient, it is painfully slow because telephone lines simply consist of pairs of twisted copper wires. These lines were primarily designed to carry analog voice signals rather than digital data. As such, telephone lines are bandwidth limited, and the rate at which digital data can be transmitted is relatively quite slow. It can take several minutes or even hours to download picture, audio, and video files via standard telephone modems. Hence, telephone modems are not ideally suited for conveying video (e.g., teleconferencing, movies, etc.), graphics (e.g., computer-aided design, medical imaging, simulations), or multimedia applications.

A faster medium for high-speed communications entails the use of dedicated computer networks, whereby computers are interconnected to form local area networks or wide area networks (LAN/WAN). However, the downside to this approach is the high cost of purchasing, routing, and maintaining the requisite interconnecting coaxial and fiber lines. Furthermore, highly skilled network administrators are necessary to monitor the network in order to keep it operational. In addition, expensive networking equipment (e.g., routers, hubs, repeaters, concentrators, servers, bridges, etc.) must be purchased and installed. Hence, the advantage of having faster data communications and higher bandwidth comes at a steep price. Furthermore, it is prohibitively expensive to set up dedicated computer networks amongst individual homes.

There is, however, another medium which is widespread and already in place and which also has a very high bandwidth suitable for transmitting vast amounts of information. This medium is the cable TV (CATV) networks. CATV is comprised of coaxial and fiber optic cables which have very high transmission capacity. These CATV lines connect a central station or headend to set-top boxes in everyone's homes. In the past, CATV was primarily limited to being a one-way only transmission medium. Rather than transmitting TV signals through the airwaves, the TV signals were distributed from the headend terminal, over the CATV network, to a host of subscriber units. After down conversion, the RF TV signals are eventually input to a subscriber's television set. However, instead of simply broadcasting TV signals, it is feasible to use these same CATV networks to provide high capacity two-way data communications. In fact, developers have been working on systems for delivering various digital data over standard CATV networks. By using a cable modem coupled to the CATV network, computers can transmit and receive packet data much more quickly.

There are several problems which must be overcome in order to successfully commercialize two-way data communications over a CATV network. One of the problems encountered with utilizing CATV as a data highway is due to the fact that there is a wide proliferation of different data formats, rates, and requirements. On the one hand, digital files are often sent by means of packetizing the data and independently routing the packet data according to a widely accepted Ethernet protocol. In contrast, internet traffic is handled according to a specific Internet protocol (IP). Also, digital video adheres to an industry standard Motion Pictures Experts Group (MPEG) format. And there are well established telephony standards as well. Each of these formats were developed for accomplishing a specific task and is not readily suitable for other uses. For example, the Ethernet protocol efficiently routes individual packet data to their respective destinations. Although it is possible to digitize audio and video signals and transmit the data as Ethernet packets over CATV, there may be significant delays incurred while awaiting the arrival of the data packets. Hence, it would be difficult to transmit live video or hold telephone conversations via Ethernet. Likewise, it would be extremely difficult and inefficient to transmit data files via the MPEG standard.

Another problem relates to the fact that some data transmissions are extremely delay sensitive, whereas other data might not be as time critical. For example, telephone communications requires that the corresponding data be transmitted rapidly so that the parties can carry on conversations with imperceptible lags. The same holds true for video teleconferencing. In contrast, Internet data can be routed as bandwidth permits because users can suffer slight delays in receiving the data for display and in the transmission of IP datagrams. Other problems arise due to the unique situation whereby there is a single headend controller servicing a multitude of cable modems. The headend controller must transmit in a one-to-many mode. Conversely, the cable modems must transmit in a many-to-one configuration. Identifying and routing which signals are to be sent to one or more specific cable modems is quite challenging. Likewise, allocating bandwidth and resources to handle the multitudes of cable modem transmissions can be overwhelming.

The present invention overcomes these problems by applying a cell-based Asynchronous Transfer Mode (ATM) approach to CATV networks. The selection of ATM cells as the data-link layer protocol has several advantages. First, it is capable of supporting services requiring real-time functionality (e.g., full-duplex voice communications, video teleconferencing, etc.). At the same time, it is also well suited for handling data transmissions which are not as delay sensitive (e.g., Internet services). In addition, the nature of an ATM cell based system allows for other multimedia applications to be upgraded without requiring iterative changes to the underlying structure. With the present invention, packet data in various formats are converted into ATM cells and transmitted in a shared radio frequency spectrum over standard cable TV networks. Virtual connections are exploited to appropriately prioritize and route individual cells. Hence, the present invention offers a flexible, effective, economic, and fully integrated multimedia bearer system granting immediate support for Internet services, traditional voice telephony, and digital video services.

SUMMARY OF THE INVENTION

The present invention pertains to a system and media access control method as a means by which two or more Subscriber Terminal Units (STUs) share a common set of transmit and receive Radio Frequency (RF) channels over a CATV network comprised of either an all coaxial network or a Hybrid Fiber-Coaxial (HEC) network for the purposes of exchanging messages based on the format of ATM cell based messages. The bi-directional transfer of the cell based messages are used to support the transfer of higher layer protocol messages (e.g., Ethernet, IP protocol datagrams, telephony, or MPEG digital video) between a CATV head-end and a subscriber.

The head-end communications controller resides at a cable television network distribution point. The controller has responsibility for managing all resources supplied to it. In particular, it allocates downstream and upstream message resources over the assigned physical interfaces. The sharing discipline on the downstream RF channel is a one-to-many method, whereby the head-end transmitter broadcasts to all stations on the common RF channel. Messages from the head-end controller many either be unicast, multicast, or broadcast. The sharing discipline on the upstream RF channel is a many-to-one method, whereby may stations are sharing the same upstream RF channel. Messages are always unicast and sent from the station to the head-end controller. To transmit, a station must have permission from the head-end controller to use a portion of the upstream RF channel resources. These permissions are allocated in the form of a contention grant, direct grant, or as an acquisition grant.

The basic method of operation is that each station requests upstream resources by sending a resource request message. Resource requests are transmitted to the head-end controller as a response to a contention grant or as part of the overhead with each message sent as a response to a direct grant. The head-end controller accumulates resource requests from all stations and apportions upstream resources appropriate to meeting the needs of all stations. Station responses to contention grants are processed using an adaptive persistent backoff contention method—a directed exponential backoff mechanism in the slot(s) assigned in the grant. Direct grants are non-shared allocations, each to a specific station. An acquisition grant is used as part of the new station registration process.

All grants assign resources based on the location of an upstream frame which is known to all active stations. The upstream frame is synchronized to a downstream frame. For each station, the relation of its notion of the upstream logical frame timing to the downstream frame reception is set as part of the acquisition process. A Time Division Multiplexing (TDM) technique is used on the upstream channel. The upstream is slotted, a message is placed within a slot and upstream slots are numbered. All grants then specifically assign a small window of resources based on the notion of slot number and number of slots to use for the grant. All grants are non-permanent and renewable. They expire immediately after their grant window. All grants are sent contained within ATM Operations, Administration, and Maintenance (OA&M) messages in the downstream channel. One ATM message may contain many direct grants, with each grant directed to a different station.

All stations participating in the subnetwork are assigned a Station Unique Identifier (SUID) as part of the acquisition process. This SUID is used to send messages to that station. Station identifiers are not persistent. Each time a station is powered up, it is assigned a station identifier during the acquisition process. Stations are also assigned one or more station multicast addresses. The IEE 48-bit Logical Link Control (LLC) Media Access Control (MAC) address of the station is discovered by the head-end during the acquisition process. The head-end controller maintains a mapping of 48-bit MAC address (as used in the Ethernet Destination) to logical station address. Ethernet frames are transmitted between the head-end and all subscriber terminal units using ATM Adaptation Layer 5 (AAL5). Specifically, all stations participating in supporting any Ethernet layer frame transmission are required to use AAL5 segmentation and reassembly techniques over the ATM facilities. It should be appreciated that the present invention is a message based system which maintains protocol layer independence between the media access control and physical layers, thereby allowing application to a variety of physical link mediums and speeds.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
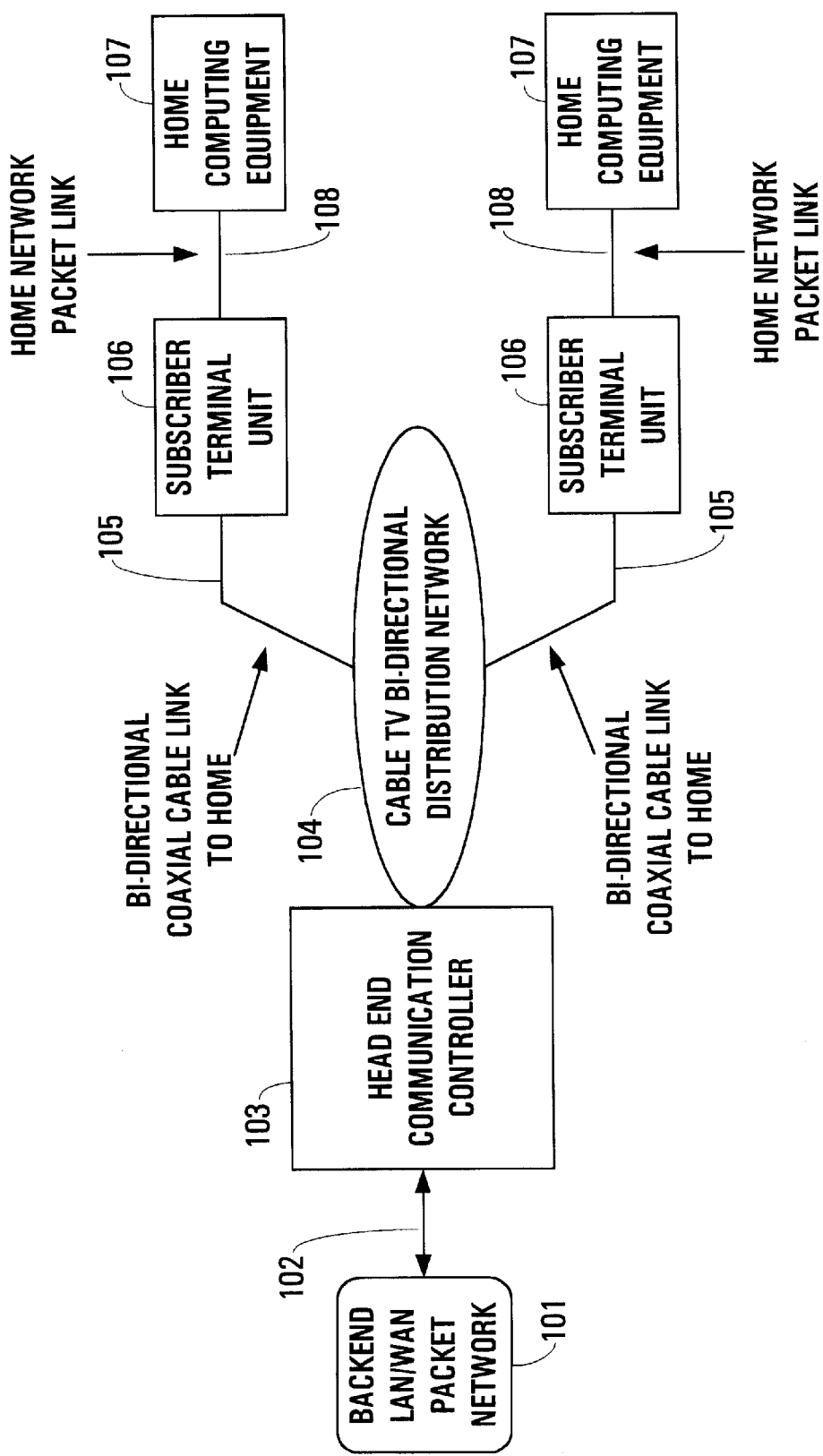
FIG. 1 shows a head-end communication controller coupled to the subscriber terminal units in a cable television network.

A system and method for prioritized packet to ATM cell bi-directional transmission between a headend controller and multiple station terminal units over a cable network is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Residential broad band access network technology based on Asynchronous Transfer Modem (ATM) cell transmission is viable. The capabilities provided by ATM access network support integrated services bandwidth available in excess of those provided by traditional twisted pair copper wire public telephone networks. ATM services to the subscriber home place needed Quality of Service capability closest to the subscriber premises allowing immediate support for Internet services, traditional voice telephony, and digital video services.

The selection of ATM cells as the data-link layer protocol data unit for Cable TV networks has the advantage in that it provides a suitable integrated multiplexing platform capable of supporting both Constant Bit Rate (CBR) scheduling service for isochronous services and the Available Bit Rate (ABR) scheduling service for best effort traffic classes which is well suited for Internet services. In addition, the nature of ATM cell based systems allow for other multimedia applications to be added in the future without requiring iterative changes to the basic ATM protocol. Cable operators can deploy ATM systems as part of an evolutionary path to a fully integrated multimedia bearer service offering.

In one embodiment, a Media Access Control (MAC) protocol layer is layered or coupled to existing physical RF transmission system to create a means to pass cell-based data-link layer information between cooperating subscriber terminal units (STUs—also known as cable modems) and the head-end controller. In one embodiment, the ATM data-link protocol is layered in a straightforward manner using a slotted approach for both the downstream and upstream RF channels. Downstream traffic management is not distributed and is under the direct control of the head-end communications controller. Upstream traffic management must be creatively controlled to support the Quality of Service (QOS) needs of the subscriber system on a user demand basis. The choice of the allocation protocol and the placement of the bandwidth ownership intelligence is important. To properly allocate and mange CBR streams in a contention-free manner, the straightforward approach is to place the ownership of the upstream bandwidth subscriber unit and by centralizing the allocation intelligence in the network. Communications between the head-end controller and each subscriber unit is important as permission to use the upstream channel is granted by the head-end controller whose allocation algorithm must take into account needs communicated to it by each subscriber unit. These communications between bearer service elements must support at least a subset of the ATM User Network Interface (UNI) traffic management classes: i.e., Constant Bit Rate (CBR), Available Bit Rate (ABR), Variable Bit Rate (VBR), and Unspecified Bit Rate (UBR).

Further, the use of ATM as the basic data-link protocol data unit transmitted over the access network directly supports the use of non-ATM network interfaces with the subscriber home or small business. Specifically, other networking services are transmitted over ATM using standard ATM adaptation layer methods as details in ITU-T standards, ATM Forum specification, and Internet Engineering Task Force Internet protocol standards. Examples of the other network services include, but are not limited to: Ethernet, IP datagrams, digital video using MPEG2 standards, and telephony.

Residential system architectures shall be constructed such that both small and large systems can be built that work in the variety of cable television plants that exist today and allow incremental growth such that deployment of Synchronous Optical NETwork (SONET) technology is easily incorporated in a variety of places within the back-end and distribution networks.

As used herein, the following terms have the following meanings:

"ATM data" refers to cells having a fixed length comprised of a header followed by a payload, which is commonly 48 bytes.

"Channel spacing" refers to the minimum RF spectral bandwidth spacing needed between communication channels, this is also referred to as the minimum RF spectral bandwidth needed by a communication channel.

"Communications channel" refers to the allocation of a range of radio frequency spectrum for conveying digital information.

"Contention grant" refers to the signal generated by the headend controller which gives permission for any STU to transmit in a particular slot.

"Direct grant" refers to the signal generated by the headend controller which allows an STU to transmit an ATM cell.

"Downstream" refers to the direction of communications from a CATV headend towards the subscriber home or small business.

"Downstream channel" refers to a downstream communications channel.

"Headend Controller" refers to the device located at Cable TV network's distribution point for performing subnetwork functions.

"Null grant" refers to a signal issued by the headend controller to an STU which instructs the STU to delay entering an idle state.

"Packet data" refers to the components of a protocol packet comprised of a fixed or variable length header and either a fixed or variable length data payload.

"QAM" refers to Quadrature Amplitude Modulation, which is a well known encoding and decoding method for digital data. "16 QAM" refers to a method which produces a digital bit carrying gain of 4 bits per Hertz. "64 QAM" refers to a method which produces a digital bit carrying gain of 6 bits per Hertz. "256 QAM" refers to a method which produces a digital bit carry gain of 8 bits per Hertz.

"QPSK" refers to Quadrature Phase Shift Keying modulation, which is a well known encoding and decoding method for digital data. QPSK produces a digital bit carrying gain of 2 bits per Hertz.

"Upstream" refers to the direction of communications form the subscriber home of small business to the CATV head-end.

"Upstream channel" refers to an upstream communications channel.

Referring to FIG. 1, a head-end communication controller 103 coupled to the subscriber terminal units 106 in a cable television network 104 is shown. A backend LAN/WAN packet network 101 transmits and receives packet data to/from the headend controller 103 over a network interface 102. These packet data correspond to exclusive or combination of Ethernet, ATM (including SONET, D353, or T1), FDDI, or voice (TR303, TR57, or TR08) protocols. The headend controller 103 facilitates communications, both upstream and downstream, and is responsible for all bandwidth management and all resource management, including modulation, frequency, bandwidth, and power assignment. The headend controller prioritizes upstream ATM cells. Moreover, it also converts packet data into ATM cells and assigns virtual connection to each individual ATM cell. This virtual connection information allows individual cells to be prioritized for transmission. In addition, the virtual connection information is used to identify one or more subscriber terminal units (STUs) which are to receive the particular cell. More specifically, the virtual connection information identifies particular circuits within designated STUs to which an individual ATM cell is to be routed. The ATM cells are then sent as one or more RF signals over the bi-directional CATV distribution network 104. The CATV distribution network 104 consists of standard coaxial cable, hybrid fiber-coax (HFC) cable, or fiber optic cables. Cables 105 provide physical links to multiple subscriber terminal units, such as STUs 106. Local packet links 108 are used to establish communications between the STUs 106 and personal computers 107.

In summary, packet data originating from backend LAN/WAN network 101 are sent to the headend controller 103 and converted into ATM cells. These ATM cells are prioritized and routed according to their respective virtual connections and sent downstream as RF signal(s) over the CATV network 104. The target STU(s) 106 demodulate the RF signal(s), convert the ATM cells into data packets, and forwards the packet data to PCs 107. Conversely, a number of PCs 107 may forward packet data to their respective STUs 106. The packet data are converted into ATM cells and transmitted upstream in a slotted burst mode over the CATV network 104 to the headend controller 103. The ATM cells are then converted back into packet data which are sent on to the LAN/WAN network 101.

Figure 2:
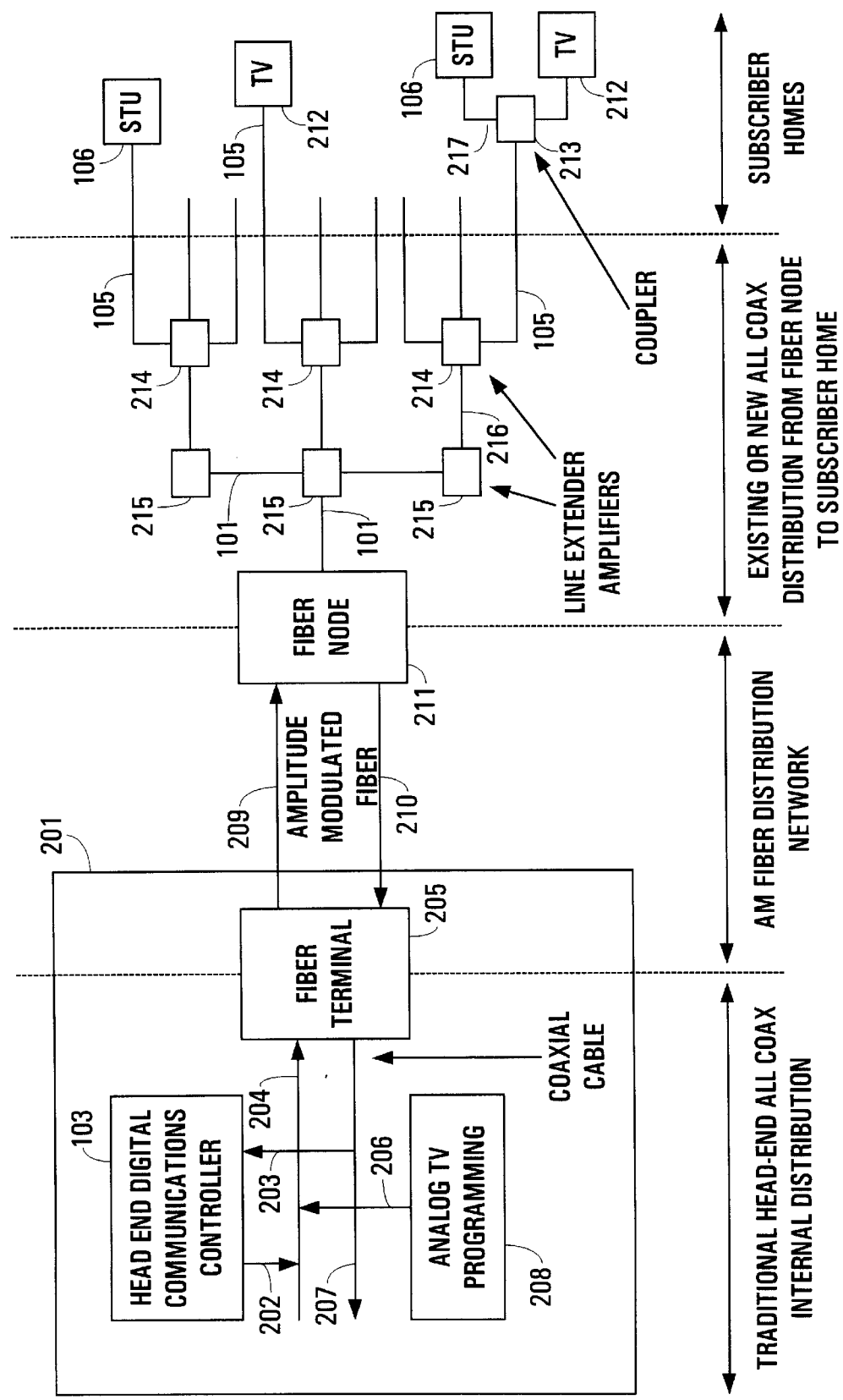
FIG. 2 illustrates a Hybrid Fiber-Coax Cable TV distribution network with a headend network and the placement of the head-end communications controller and subscriber terminal units.

FIG. 2 illustrates a Hybrid Fiber-Coax Cable TV distribution network with a headend network 201 and the placement of the head-end communications controller 103 and subscriber terminal units 106. The headend network 201 consists of a headend digital communications controller 103 for controlling all digital data traffic, both to the fiber terminal 205 via coaxial links 202 and 204 and from the fiber terminal 205 via coaxial links 203 and 207. Traditional analog TV programming by block 208 can be supported as well by transmitting the RF television signals over lines 206 and 204 to the fiber terminal 205. Fiber terminal 205 is used as an interface to the fiber node 211. Amplitude modulated fiber cables 209–210 provide the connections between the fiber terminal 205 and fiber node 211. A plurality of junctions 213–215 splitting off from fiber node 211 form a coaxial distribution network for routing signals to/from a number of STUs 106 and television sets and set-top boxes 212. For example, STU 106 is connected to fiber node 211 via line 105, line extender/amplifier 214, line 216, line extender/amplifier 215, and line 101. Likewise, a television set or set-top box 212 is connected to the fiber node 211 via coupler 213, line 105, line extender/amplifier 214, line 216, line extender/amplifier 215, and line 101. The delineation between the various stages of a traditional headend all coax internal distribution, analog fiber distribution network, existing or new all coax distribution, and subscriber homes/offices is shown in this figure.

Figure 3:
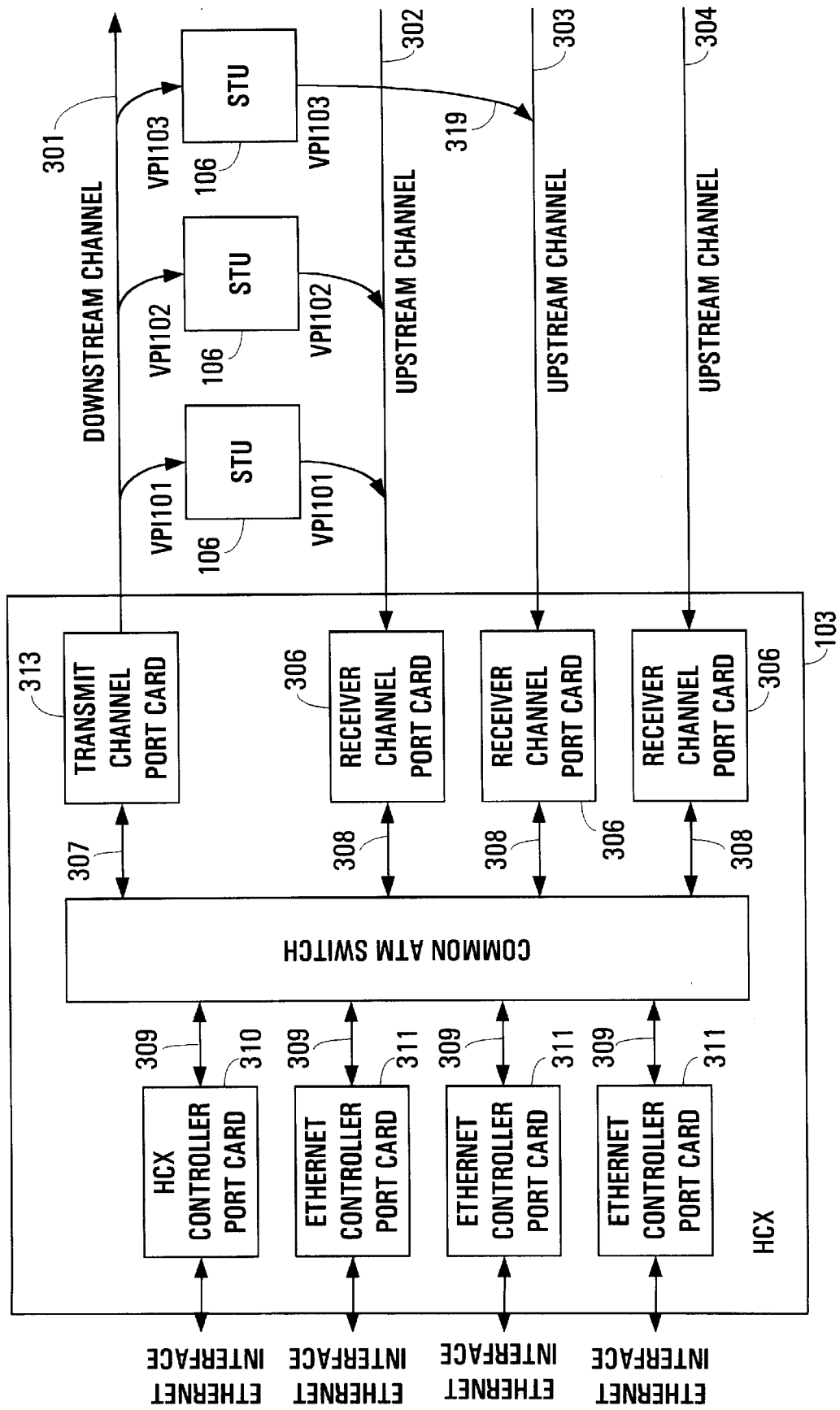
FIG. 3 illustrates the connection of downstream and upstream channels between the headend controller and the subscriber terminal units.

FIG. 3 illustrates the connection of downstream 301 and upstream channels 302–304 between the headend controller 103 and the subscriber terminal units 106. The headend controller (HCX) 103 is comprised of an HCX controller port card 310 which allows an external device/network to direct and monitor the operations of the HCX. A number of ethernet controller port cards 311 (also referred to as Ethernet root controllers) are used to provide an interface between the HCX 103 and a number of Ethernet signals. The ethernet communications is routed according to the command ATM switch 305. One or more RF signals containing ATM cells are sent by the transmit channel port card 313 to the various STUs 106 via the downstream channel 301. Although only one downstream channel is shown, other embodiments include multiple downstream channels. Individual ATM cells are routed to their intended destinations according to their respective virtual path identifiers (VPIs). The VPIs are included as part of the ATM cells. For example, VPI101 is used to identify the left STU; VPI102 is used to identify the middle STU; and VPI103 is used to identify the right STU. Any number of upstream channels 302–304 may be used by the STUs 106 to transmit signals to the HCX 103. A specific feature of the present invention is that if more than one upstream channel is active for that head-end controller on a given physical return, then stations may be hopped from one upstream channel to another. For example, VP103 may be hopped onto upstream channel 304 in lieu of the regular upstream channel 302 via VPI103 and line 319. This behavior is under control of the head-end and will be used for load balancing, or to move stations to a cleaner upstream channel in the event of severe noise impairments, etc. The receiver channel port cards 306 are used to receive slotted, burst RF signals containing ATM cells from each of the upstream channels. It should be noted that the cards 306,3310,311, and 313 are all connected to a common ATM switch 305 via links 307–309.

Figure 4:
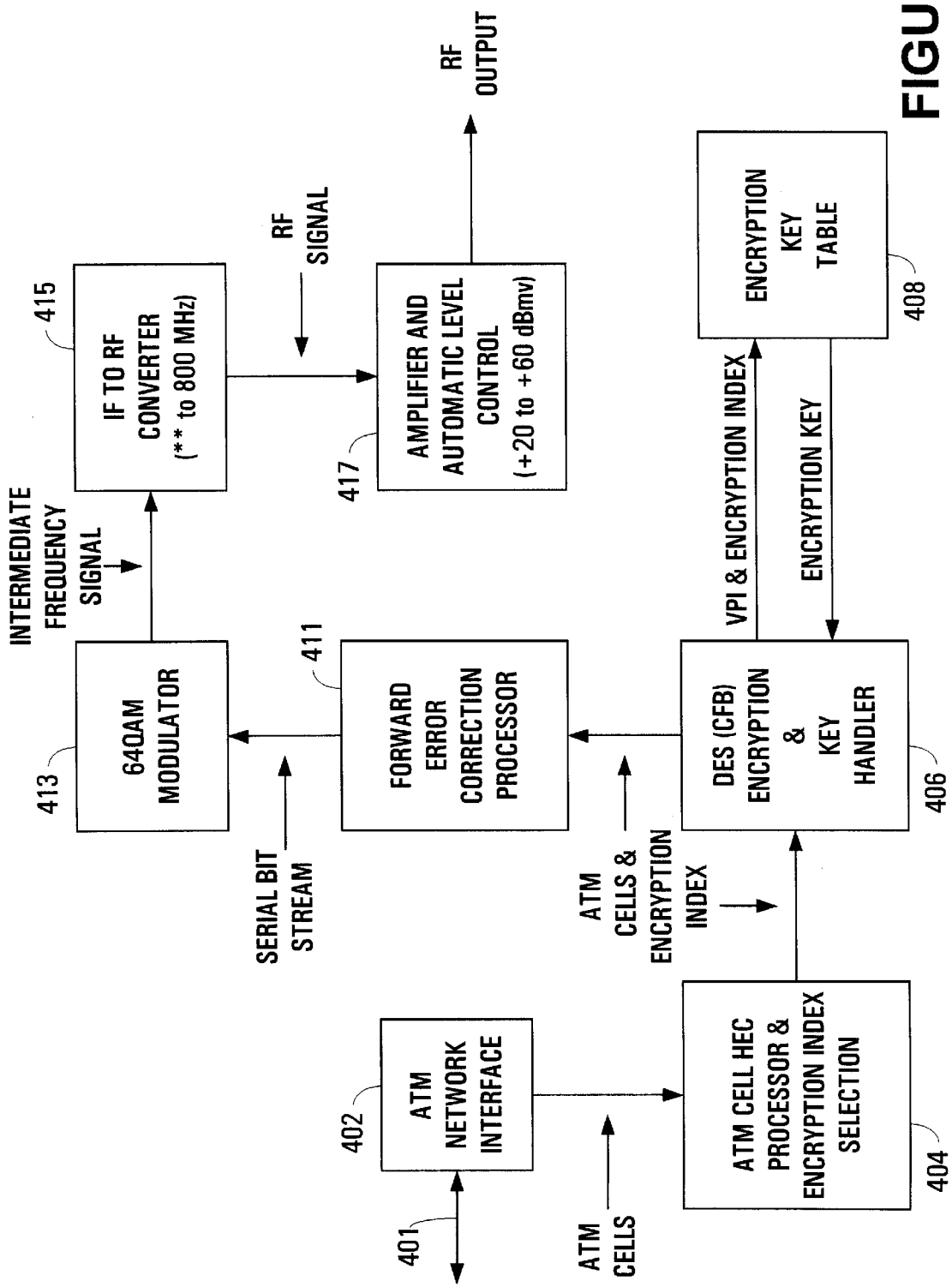
FIG. 4 is a detailed block diagram of the transmit channel port card in the headend controller used for processing downstream transmissions.

FIG. 4 is a detailed schematic of the circuitry in the headend controller used for processing downstream transmissions. Packet data arriving from an outside source (e.g., computer network) are input via line 401 to an ATM network interface 402 which converts them into ATM cells. The ATM cells are then processed by the ATM cell processor 404 which performs a Header Error Check (EC) and selects an encryption index. The ATM cells and the encryption index are sent to a Data Encryption Standard (DES) encryption and key handler block 406 which encrypts the ATM cell payload according to an encryption key. The encryption key is supplied by referencing the VPI and encryption index to an encryption key table 408. A forward error correction processor 411 provides error correction capability (e.g., CRC) for individual ATM cells. The resulting serial bit stream is then modulated by a 64QAM modulator 413. The modulated intermediate frequency (IF) signal is converted to a radio frequency (RF) signal by IF to RF converter 415 for downstream transmission over the CATV network In the currently preferred embodiment, the RF signal corresponds to 88 to 800 MHz. Before transmission, the RF signal is amplified and automatic level control is performed by block 417. In the currently preferred embodiment, the power level of the RF signal is maintained at +20 to +60 dBmv. The downstream RF channel is managed as a one-to-many system in that the headend has one transmitter and each station has one receiver. There can be many stations participating on that single downstream channel. Each station is addressed separately (unicast), via a group address (multicast), or via an all stations broadcast (broadcast). The details on station addressing are presented later in this description.

Figure 5:
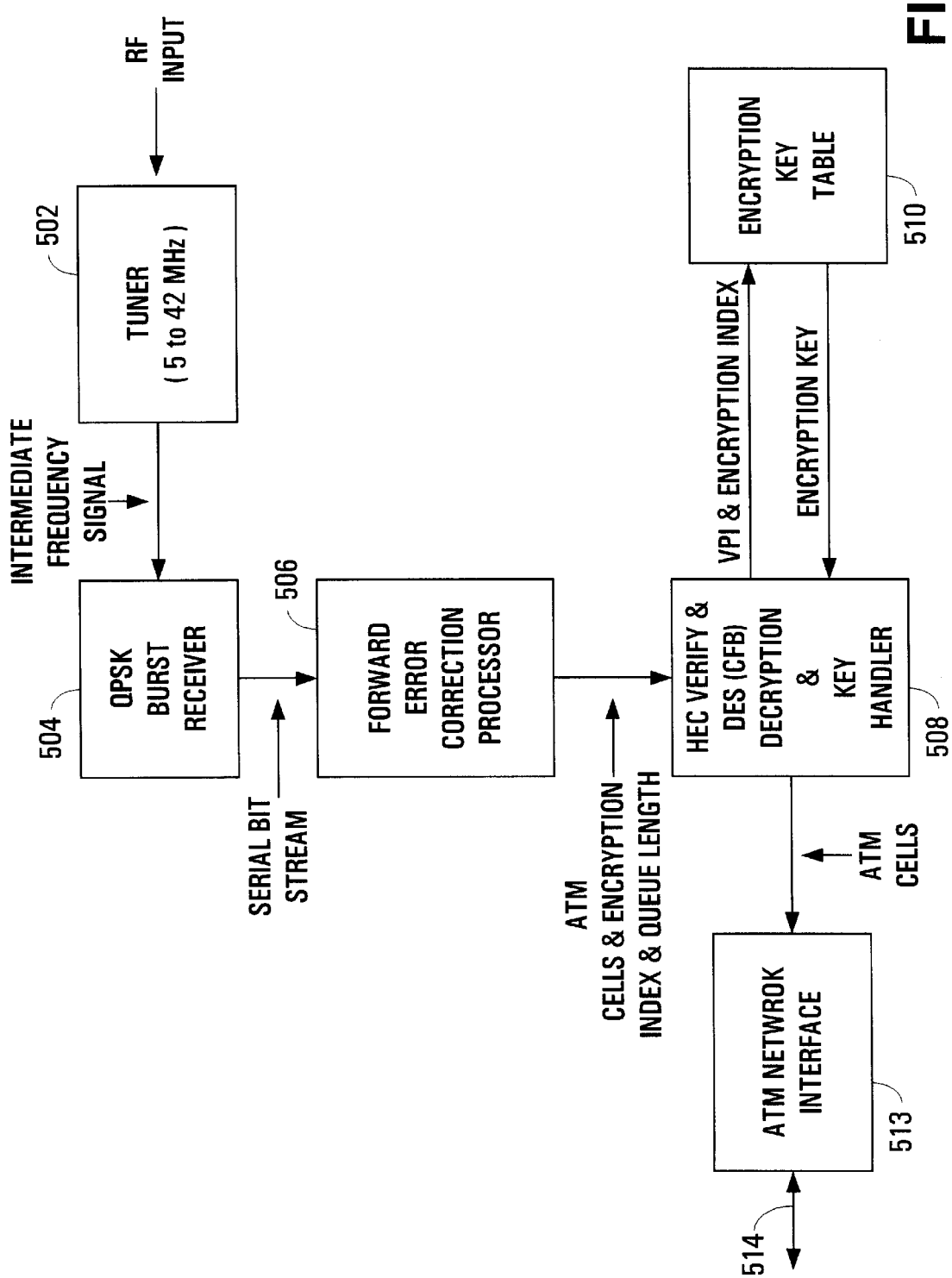
FIG. 5 shows a detailed block diagram of the receiver port card of the headend controller used for processing upstream transmissions.

FIG. 5 shows a detailed schematic diagram of the headend controller used for processing upstream transmissions. One or more RF signals received from the CATV network are input to the headend controller. A tuner 502 is used to tune in the frequencies of interest. In the currently preferred embodiment this corresponds to 5 to 42 MHz. The IF signal output from the tuner is demodulated by a QPSK burst receiver 504. The demodulated serial bit stream containing the ATM cells are then sent to processor 506 which verifies the HEC, performs DES (CFB) decryption and key handler functions. The encryption key table 510 is referenced according to the VPI and encryption index to determine the proper encryption key. Thereupon, the HEC verify, DES (CFB) decryption, and key handler block outputs ATM cells to the ATM network interface 513 which converts the data into packets for output to an external device or network via line 514.

Figure 6:
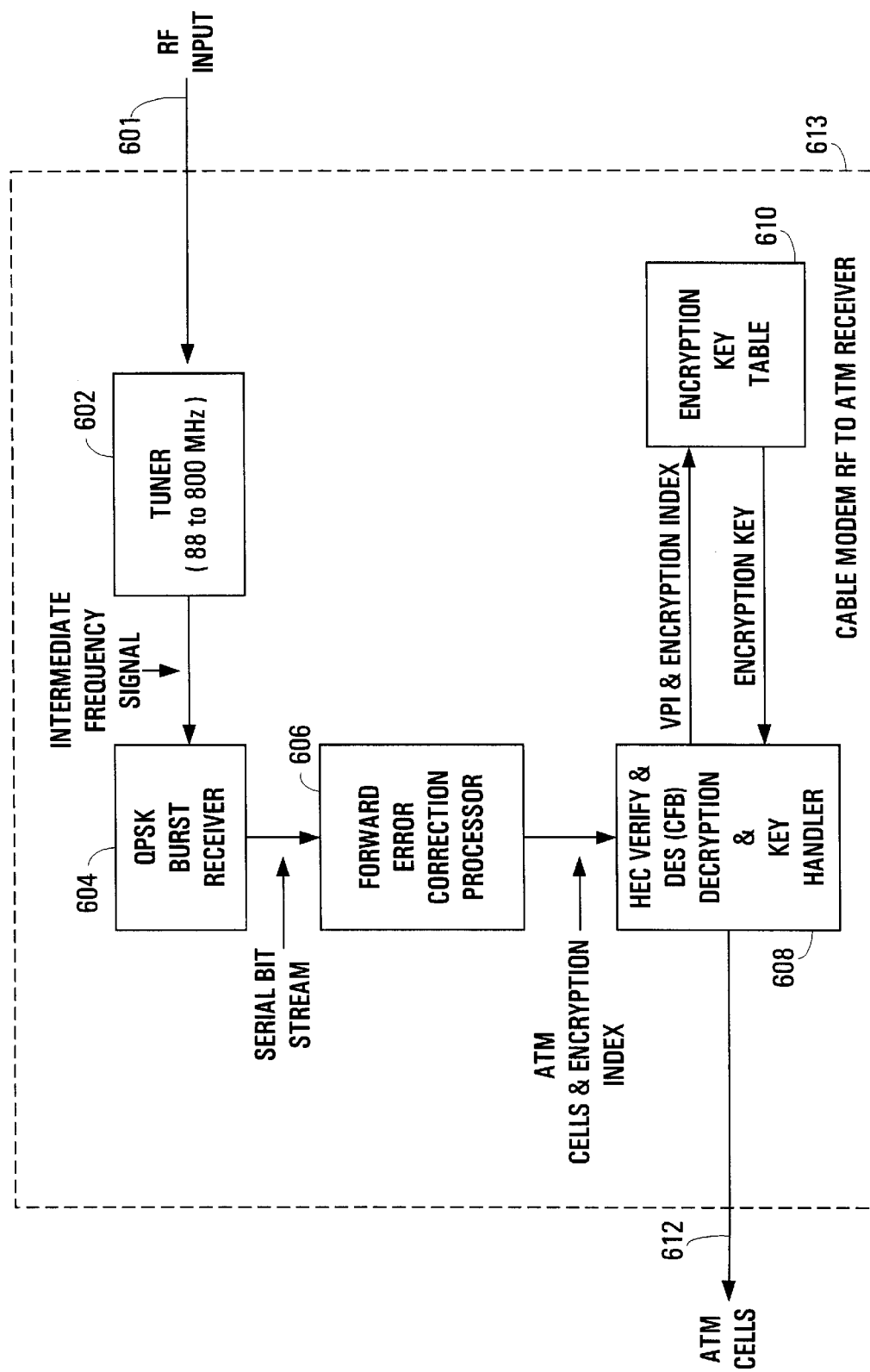
FIG. 6 shows a detailed schematic diagram of the processing of a downstream transmission by an STU.

FIG. 6 shows a detailed schematic diagram of the processing of a downstream transmission by a cable modem RF to ATM receiver 613. The downstream RF signal sent from the headend controller over the CATV network on line 601 is received by the tuner 602. In the currently preferred embodiment, tuner 602 is tuned to the frequency range of 88 to 800 MHz which matches the frequency corresponding to the converter in the headend controller. The IF signal from the tuner 602 is demodulated by the 64QAM demodulator 604. The resulting serial bit stream containing the ATM cells are checked by the forward error correction processor 606. The ATM cells and encryption index from processor 606 is the verified and decrypted by block 608. This is accomplished by referencing the encryption key table 610 with the VPI and encryption index. Based thereon, the appropriate encryption key is supplied to block 608. The decrypted ATM cells can then be sent on to the personal computer on line 612.

Figure 7:
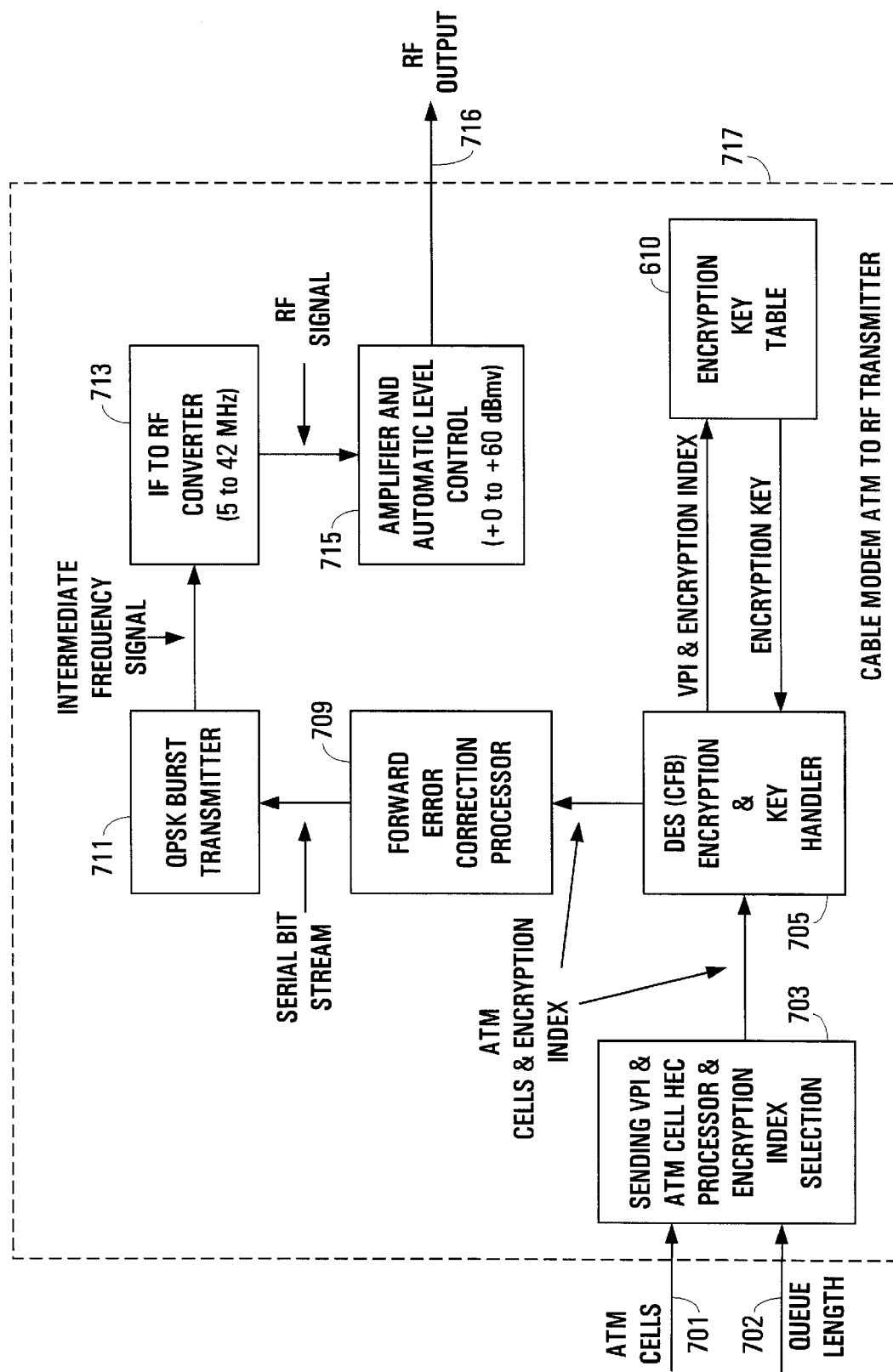
FIG. 7 is a detailed schematic of the circuitry in an STU used for processing upstream transmissions.

FIG. 7 is a detailed schematic of the circuitry in an STU used for processing upstream transmissions by the cable modem ATM to RF transmitter 717. ATM cells on line 701 are input to block 703. Furthermore, a queue length is also input to block 703 on line 702. Based on this information, processor 703 provides the ATM cells with the appropriate VPI, encodes the HEC bits, and encrypts the ATM cells. The ATM cells, encryption index, and queue length are sent to the DES encryption and key handler block 705 which encrypts the ATM cell payload according to an encryption key. The encryption key is supplied by referencing the VPI and encryption index to an encryption key table 610. A forward error correction processor 709 provides standard ATM cell header error check processing and forward error correction processing for the burst transmission. The resulting serial bit stream is then modulated by a QPSK burst transmitter 711. The modulated intermediate frequency (IF) signal is converted to a radio frequency (RF) signal for downstream transmission over the CATV network by block 713. In the currently preferred embodiment, the RF signal corresponds to 5 to 42 MHz. Before transmission, the RF signal is amplified and automatic level control is performed by block 715. In the currently preferred embodiment, the power level of the RF signal is maintained at +0 to +60 dBmv. The upstream RF channel is managed as a many-to-one system in that multiple STUs may transmit to the headend controller.

A detailed description of the Distributed Hierarchic Ethernet Switch is now presented. The hierarchic Ethernet switch supports the bidirectional exchange of Ethernet frames between a common Ethernet interface connected to an Ethernet Root Controller ("controller"). Common Ethernet interfaces are connected to a plurality of Ethernet Leaf Processors ("stations"). The controller is connected to a plurality of stations via a common distributed ATM network, which is comprised of commonly available ATM switches interconnected via commonly available ATM links. The ATM cell virtual connections and Ethernet information flow is organized as a strict tree based ordered hierarchy, whereby the controller serves as the root to each station. Information flow from the controller to one or more stations is defined as the "downstream" direction. Information flow from a station to the controller is defined as the "upstream" direction. A virtual connection is defined to be a configured unidirectional ATM cell path through the ATM network, using common ATM semantics. It is based on the ATM cell Virtual Path Identifier (VPI) value and the Virtual Circuit Identifier (VCI) value. A virtual connection is indicated by "VCxx,yy", where "xx" represents the VPI value, and "yy" the VCI value. For example, VC1,10 means a virtual connection with a VPI value of 1 and a VCI value of 10.

The downstream information flow supports unicast information flow. In other words, flow that is from the controller to a single station. Unicast information flow is directly supported by use of ATM point-to-point virtual connections. Multicast information flow is also supported, that is from the controller to any preselected group of two or more stations. Multicast information flow is directly supported by use of ATM point-to-multipoint virtual connections with the controller being the source of the virtual connection and with two or more stations being receivers in the multicast group. And broadcast information flow is also supported, that is from the controller to all stations. Broadcast information flow is directly supported by use of a single ATM point-to-multipoint virtual connection with all stations being members of the multicast group. The upstream information flow supports unicast only, that is from the station to the controller. The strict hierarchy of the inventive method requires that all information flow from one station to another to pass through the controller. In one embodiment of the present invention, a station with a single Ethernet interface, exchanges Ethernet information with a single controller only. The set of all stations that communicate with the controller and the controller is defined to be an Ethernet Local Area Network (LAN) segment.

Figure 8:
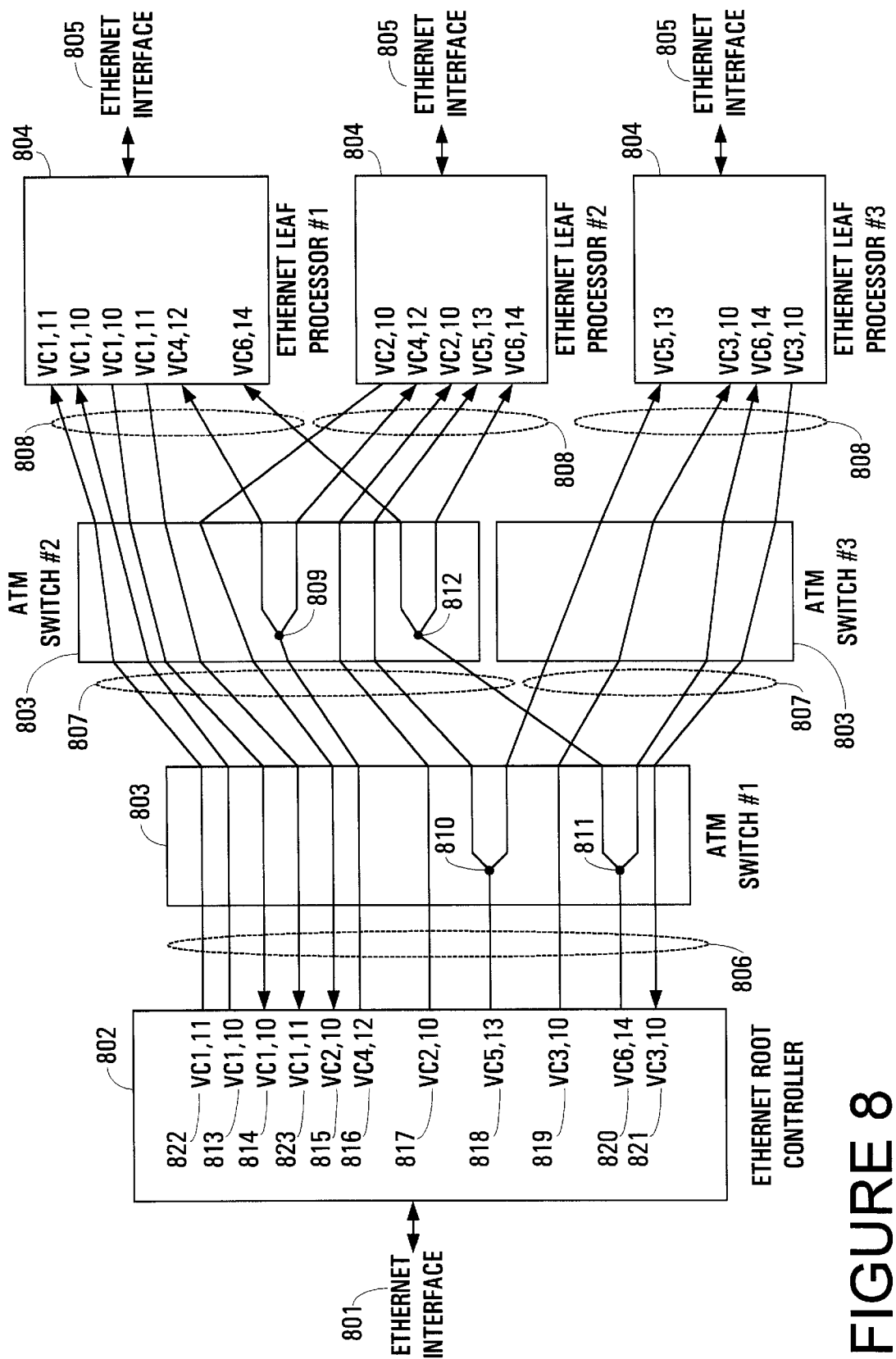
FIG. 8 schematically illustrates an Ethernet Root Controller connected to Ethernet Leaf Processor.

FIG. 8 schematically illustrates the Ethernet Root Controller 802 connected to Ethernet Leaf Processor #1 804, Ethernet Leaf Processor #2 804, and Ethernet Leaf Processor #3 804 via an ATM network comprised of commonly available ATM Switches: ATM Switch #1 803, ATM Switch #2 803, and ATM Switch #3 803 interconnected via commonly available ATM cell links 807. The Ethernet Root Controller 802 is connected to ATM Switch #1 803 via a commonly available ATM link 806. Ethernet Leaf Processor

1 804 and Ethernet Leaf Processor #2 804 are each connected to ATM Switch #2 803 via commonly available ATM links 808. Ethernet Leaf Processor #3 804 is connected to ATM Switch #3 803 via ATM link 808. An Ethernet Interface 801, operating in promiscuous mode, connects to Ethernet Root Controller 802, and transfers all Ethernet frames received on the Ethernet Interface 801. An Ethernet Interface 805 connects to Ethernet Leaf Processor 804.

Unicast information from the controller 802 to Ethernet Leaf Processor #1 804 is transmitted on VC1,10 813 at the controller 802 and carried through the ATM network 803 and delivered to the Ethernet Leaf Processor #1 804 on VC1,10. Unicast information from the Ethernet Leaf Processor #1 804 to the controller 802 to is transmitted on VC1,10 at the Ethernet Leaf Processor #1 804 and carried through the ATM network 803 and delivered to the controller 802 on VC1,10 814.

A second virtual connection is shown supporting unicast information from the controller 802 to Ethernet Leaf Processor #1 804, transmitted on VC1,11 822 at the controller 802 and carried through the ATM network 803 and delivery to the Ethernet Leaf Processor #1 804 on VC1,11. A second virtual connection is shown supporting unicast information from the Ethernet Leaf Processor #1 804 to the controller 802 to is transmitted on VC1,11 at the Ethernet Leaf Processor #1 804 and carried through the ATM network 803 and delivered to the controller 802 on VC1,11 823.

Unicast information from the controller 802 to Ethernet Leaf Processor #2 804 is transmitted on VC2,10 817 at the controller 802 and carried through the ATM network 803 and delivered to the Ethernet Leaf Processor #2 804 on VC2,10. Unicast information from the Ethernet Leaf Processor #2 804 to the controller 802 to is transmitted on VC2,10 at the Ethernet Leaf Processor #1 804 and carried through the ATM network 803 and delivered to the controller 802 on VC2,10 815. Unicast information from the controller 802 to Ethernet Leaf Processor #3 804 is transmitted on VC3,10 819 at the controller 802 and carried through the ATM network 803 and delivered to the Ethernet Leaf Processor #3 804 on VC3,10. Unicast information from the Ethernet Leaf Processor #3 804 to the controller 802 to is transmitted on VC3,10 at the Ethernet Leaf Processor #1 804 and carried through the ATM network 803 and delivered to the controller 802 on VC3,10 821.

Multicast information from the controller 802 to both Ethernet Leaf Processor #1 804 and Ethernet Leaf Processor #2 804 is transmitted on VC4,12 816 at the controller 802 and carried through the ATM network 803 and delivered to the Ethernet Leaf Processor #1 804 on VC4,12 and delivered to the Ethernet Leaf Processor #2 804 on VC4,12. ATM Switch #2 803 performs a common ATM cell copy operation 809 to support the point-to-multipoint operation. Multicast information from the controller 802 to both Ethernet Leaf Processor #2 804 and Ethernet Leaf Processor #3 804 is transmitted on VC5,13 818 at the controller 802 and carried through the ATM network 803 and delivered to the Ethernet Leaf Processor #2 804 on VC5,13 and delivered to the Ethernet Leaf Processor #3 804 on VC5,13. ATM Switch #1 803 performs a common ATM cell copy operation 810 to support the point-to-multipoint operation.

Broadcast information from the controller 802 to all stations, specifically Ethernet Leaf Processor #1 804, Ethernet Processor #2 804, and Ethernet Leaf Processor #3 804, is transmitted on VC6,14 820 at the controller 802 and carried through the ATM network 803 and delivered to the Ethernet Leaf Processor #1 804 on VC6,14 and Ethernet Leaf Processor #2 804 on VC6,14 and delivered to the Ethernet Leaf Processor #3 804 on VC6,14. ATM Switch #1 803 performs the first common ATM cell copy operation 811 and ATM Switch #2 803 performs the s second ATM Cell copy operation 812 to support the point-to-multipoint operations necessary to include all stations in the multicast group.

It should be noted that more than one controller and many stations may be connected to the ATM network. The nature of ATM networking allows many simultaneous virtual connections to be established across the network, thereby allowing each controller to communicate with a subset of all stations; such that each station communicates with only a single controller and that all stations are configured to communicate with a controller. Each controller therefore defines a virtual Ethernet LAN segment and many segments many operate through the same ATM network simultaneously. Furthermore, commonly available ATM Switches can support an arbitrary number of receivers in a point-to-multipoint group. Additionally, an arbitrary number of unicast virtual connections may be established through the ATM network to the same ATM endpoints.

Consequently, ATM cells are capable of being routed to a cable modem on a virtual connection basis. Furthermore, ATM cells are capable of being transmitted from a cable modem on a virtual connection basis. The ATM cells are capable of being prioritized according to a virtual connection basis. This is accomplished in the same manner as described above for a distributed Ethernet switch.

Figure 9:
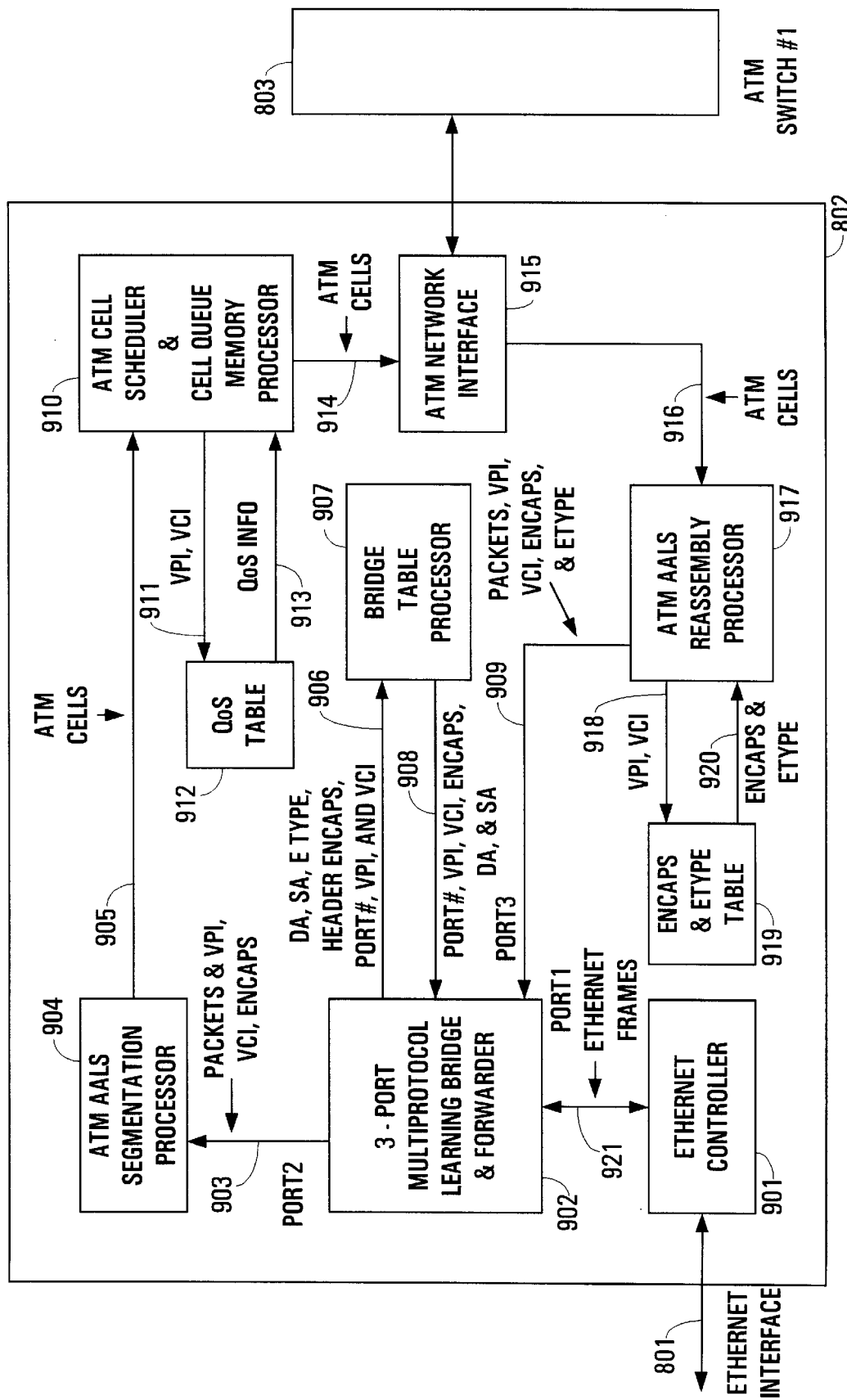
FIG. 9 schematically illustrates an exemplary Ethernet Root Controller.

FIG. 9 schematically illustrates the Ethernet Root Controller 802. Ethernet frames are received over a commonly available Ethernet Interface 801 where they are received by a common Ethernet Controller 901. Ethernet frames are then transferred 921 to the 3-Port Multiprotocol Learning Bridge and Forwarder 902 (hereafter referred to as the "Root Forwarder"). Upon receiving a Ethernet Frame from Port 1 921, the Root Forwarder 902 constructs a query 906 comprised of information obtained from the Ethernet Frame. Specifically, this includes the Destination Address ("DA"), the Source Address ("SA"), and the Ethernet Type field ("ETYPE"), additionally the port number that the Ethernet frame was received on, the first 64 octets of the Ethernet frame data or the entire data if less than 64 octets, the encapsulation type set to "null", and the VPI and va set to 0. This query 906 is received by the Bridge Table Processor 907 which performs a table lookup function based upon the information in the query. The Bridge Table Processer 907 returns a response 908 to the Root Forwarder comprised of the forwarding port number, the VPI and VCI values for the ATM virtual connection, and the ATM encapsulation type.

If the DA of the received Ethernet frame was received from Port 1 921, and indicated a unicast address of an Ethernet device connected to the Ethernet Interface 805 at Ethernet Leaf Processor #1 804. And if the EtherType value of the Ethernet frame indicated a specific type or set of types, the virtual connection is identified as VC1,11 822 and the Port number set to 2, otherwise the virtual connection is identified as VC1,10 813 and the Port number set to 2. This mechanism demonstrates that received Ethernet frames of different Ethernet types may be transmitted via different virtual connections downstream from the controller 802 to the same Ethernet Leaf Processor #1 804.

However, if the DA of the received Ethernet frame was received from Port 1 921, and indicated a multicast address whose members included Ethernet devices connected to the Ethernet Interface 805 at Ethernet Leaf Processor #1 804 and to the Ethernet Interface 805 at Ethernet Leaf Processor

2 805, the virtual connection is identified as VC4,12 816 and the Port number set to 2. If the DA of the received Ethernet frame was received from Port 1 921, and indicated a broadcast address, the virtual connection is identified as VC6,14 820 and the Port number set to 2. The Bridge Table Processor 907 follows the learning bridge forwarding semantics commonly found in the IEEE 802.1D standard. The encapsulation type response is "null" for Ethernet Frames, or "RFC1483-null" if the Ethernet frame contained an Internet Protocol ("IP") datagram and the Internet Engineering Task Force (IETF) RFC1483 standard for null encapsulation was selected, or "RFC1483-LLCSNAP" if the Ethernet frame contained protocol packet of ETYPE and the IETF RFC1483 standard for LLC/SNAP encapsulation was selected. For Ethernet frames received from Port 1 921, if the response port number was 2 in 908, the Ethernet frame, the virtual connection information, and the encapsulation type is communicated 903 to the ATM AAL5 Segmentation Processor 904. If the port number contained in the response 908 indicated Port 0, the Ethernet frame is discarded.

The ATM AAL5 Segmentation Processor 904 is responsible for receiving packets, virtual connection, and encapsulation information 903 from the Root Forwarder 902 and converting the packets into a stream of ATM cells consistent with the commonly available ATM Adaptation Layer 5 ("AAL5") segmentation semantics. Ethernet frames are encapsulated using a null encapsulation. Non Ethernet Packets are processed according to the encapsulation information 903 passed from the Root Forwarder 902. Packets are processed according to the encapsulation information. The virtual connection information is copied to the VPI and VCI values contained in the ATM cells generated by the process. The ATM cells are then transmitted 905 to the ATM Cell Scheduler & Cell Queue Memory Processor 910.

The ATM Cell Scheduler & Cell Queue Memory Processor 910 performs a lookup of the virtual connection information 911 in the Quality of Service ("QoS") table 912 to obtain the QoS information 913, which includes the ATM traffic management service class requirements and cell delay requirements, for the virtual connection. The ATM Cell Scheduler and Cell Queue Memory 910 then enqueues the ATM cells appropriate to the QoS information, orders the cells consistent with perserving the QoS of ATM cells from other virtual connections that may be previously enqueued and transmits cells 914 to the ATM Network Interface 915 for transmission over the ATM link 918 to ATM switch #1 803. ATM cells received by the ATM Networking Interface 915 via the commonly available ATM link 918 are transmitted 916 to the ATM AAL5 Reassembly Processor 917. ATM cells are reconstituted into packets according to the commonly available semantics of AAL5 and the encapsulation information 920 obtained by a lookup of the virtual connection information 918 in the Encapsulation and ETYPE Table 919. The packet, the virtual connection obtained from the ATM cells which carried the data, the encapsulation type, and ETYPE information are transmitted on Port 3 909 to the Root Forwarder 902.

Upon receiving an Ethernet Frame from Port 3 909, the Root Forwarder 902 constructs a query 906 comprised of information obtained from the Ethernet Frame, specifically the Destination Address ("DA"), the Source Address ("SA"), and the Ethernet Type field ("ETYPE"), additionally the port number that the Ethernet frame was received on, the first 64 octets of the Ethernet frame data or the entire data if less than 64 octets, and the encapsulation type. The query 906 is received by the Bridge Table Processor 907 which performs a table lookup function based upon the information in the query. The Bridge Table Processor 907 returns a response 908 to the Root Forwarder comprised of the forwarding port number, the VPI and VCI values for the ATM virtual connection, and the ATM encapsulation type. If the DA of the received Ethernet frame was received from Port 3 909, and indicated a unicast address of an Ethernet device connected to the Ethernet Interface 805 at Ethernet Leaf Processor #1 804, the virtual connection is identified as VC1,10 813 and the Port number set to 2. If the DA of the received Ethernet frame was received from Port 3 909, and indicated a multicast address whose members included Ethernet devices connected to the Ethernet Interface 805 at Ethernet Leaf Processor #1 804 and to the Ethernet Interface 805 at Ethernet Leaf Processor #2 805, the virtual connection is identified as VC4,12 816 and the Port number set to 2, additionally if the packet was an encapsulated Ethernet frame the frame is copied to Port 1 921, processed by the Ethernet controller 901 and transmitted via the Ethernet Interface 801.

If the DA of the received Ethernet frame was received from Port 3 909, and indicated a broadcast address, the virtual connection is identified as VC6,14 820 and the Port number set to 2, additionally if the packet was an encapsulated Ethernet frame the frame is copied to Port 1 921, processed by the Ethernet controller 901 and transmitted via the Ethernet Interface 801. If the DA of the received Ethernet frame was received from Port 3 909, and indicated a unicast address of an Ethernet device connected to the Ethernet Interface 801 specified as Port 1 921, the frame is transferred to Port 1 921, processed by the Ethernet controller 901 and transmitted via the Ethernet Interface 801. For Ethernet frames received from Port 3 909, if the response port number was 2 in 908, the Ethernet frame, the virtual connection information, and the encapsulation type is transferred via Port 2 903 to the ATM AAL5 Segmentation Processor 904. If the port number contained in the response 908 indicated Port 0, the Ethernet frame is discarded.

Upon receiving a packet which is not an Ethernet Frame from Port 3 909, the Root Forwarder 902 constructs a query 906 comprised of information obtained from received information 909, specifically the encapsulation type, the ETYPE, additionally the port number that the packet was received on, and the first 64 octets of the packets data or the entire data if less than 64 octets.

The query 906 is received by the Bridge Table Processor 907 which performs a table lookup function based upon the information in the query. The Bridge Table Processor 907 returns a response 908 to the Root Forwarder comprised of the forwarding port number, the VPI and VCI values for the ATM virtual connection, and the encapsulation type. If the port number received in the response 908 is Port 1, the packet and the ETYPE received from Port 3 909 and SA, and DA information returned in the response 908 is used to construct an Ethernet Frame which is then transferred to the Ethernet Controller 901 for transmission on the Ethernet Interface 801. If the port number received in the response 908 is Port 2, the packet, virtual connection, and encapsulation type information is transferred to the ATM AAL5 Segmentation Processor 904 via Port 2 903, and if the DA value in the response 908 is non zero, a copy of the packet and the ETYPE received from Port 3 909 and SA, and DA information returned in the response 908 is used to construct an Ethernet Frame which is then transferred to the Ethernet Controller 901 for transmission on the Ethernet Interface 801.

The Source Address ("SA") information from Ethernet Frames received from Port 1 921 and Port 3 909, and the virtual connection information obtained from Port 3 909 are used by the Bridge Table Processor 907 to construct a table. The table maps Destination Addresses ("DA") to Port number and virtual connections in a manner consistent with the learning bridge behavior specified in the IEEE 802.1D standard. Virtual connection information is not required for Port 1. If an SA is learned from Port 3 909, its table information in the Bridge Table Processor 907 will indicate Port 2 903 for forwarding purposes. Port 2 903 is a transmit only port, Port 3 909 is a receive only port.

Figure 10:
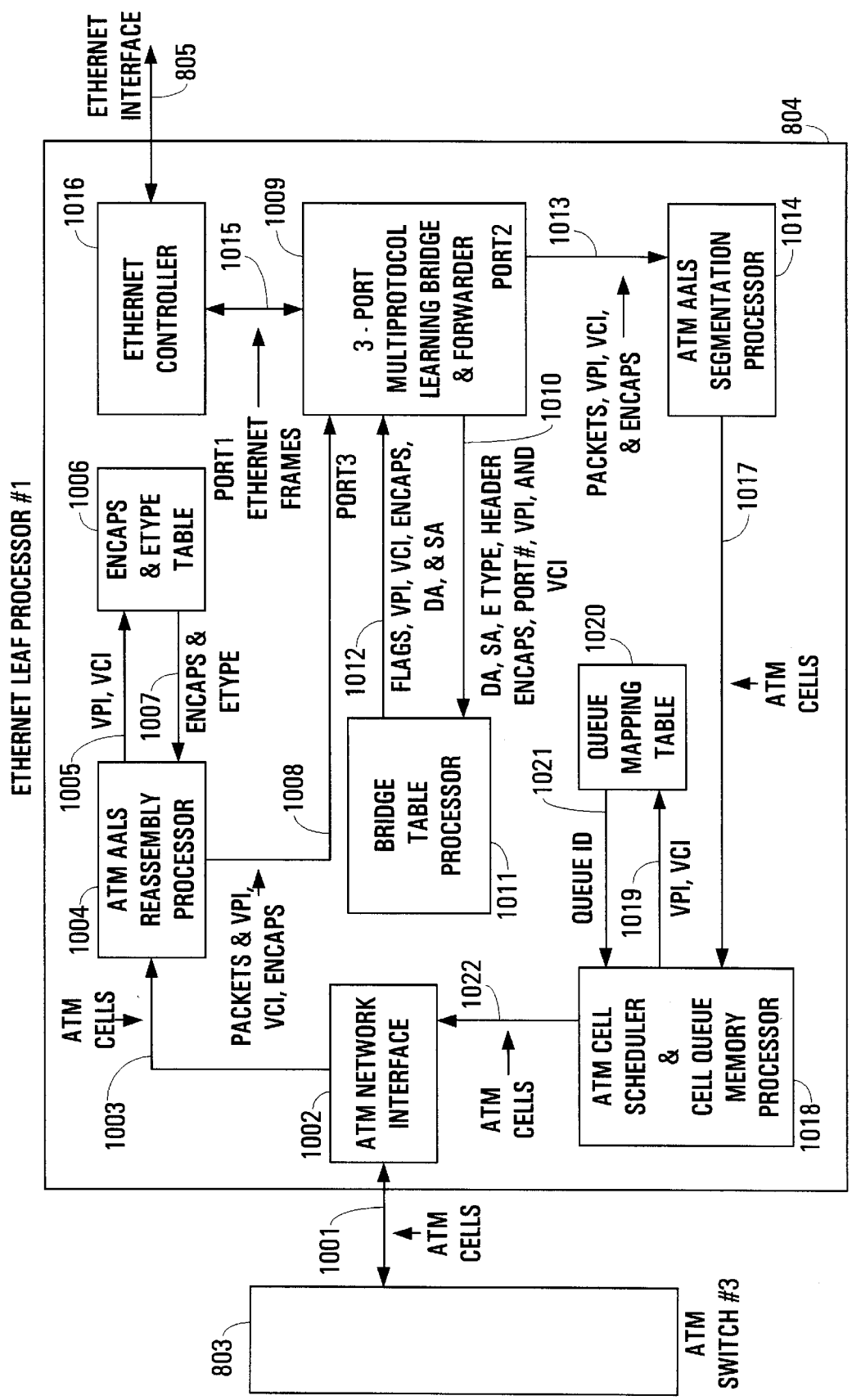
FIG. 10 schematically illustrates an exemplary Ethernet Leaf Processor.

FIG. 10 schematically illustrates the Ethernet Leaf Processor #1 804.

ATM cells received by the ATM Networking Interface 1002 from ATM Switch #3 803 via the commonly available ATM link 1001 are transmitted 1003 to the ATM AAL5 Reassembly Processor 1004. ATM cells are reconstituted into packets according to the commonly available semantics of AAL5 reassembly and the encapsulation information 1007 obtained by a lookup of the virtual connection information 1005 in the Encapsulation and ETYPE Table 1006. The packet, the virtual connection obtained from the AIM cells which carried the data, the encapsulation type, and ETYPE information are transmitted 1008 to the 3-Port Multiprotocol Learning Bridge & Forwarder 1009 (hereafter "Leaf Forwarder").

Upon receiving an Ethernet Frame from Port 3 1008, the Leaf Forwarder 1009 constructs a query 1010 comprised of information obtained from the Ethernet Frame, specifically the Destination Address ("DA"), the Source Address ("SA"), and the Ethernet Type field ("ETYPE"), additionally the port number that the Ethernet frame was received on, the first 64 octets of the Ethernet frame data or the entire data if less than 64 octets, and the encapsulation type. The query 1010 is received by the Bridge Table Processor 1011 which performs a table lookup function based upon the information in the query. The Bridge Table Processor 1011 returns a response 1012 to the Leaf Forwarder comprised of a Forward True/False flag, a Received-SA-Is-Known-SA True/False flag, the VPI and VCI values for the ATM virtual connection, the ATM encapsulation type, and SA and DA values.

If the DA of the received Ethernet frame was received from Port 3 1008, and indicated a unicast address of an Ethernet device connected to the Ethernet Interface 805 on Port 1 1015, the Ethernet frame is transferred to the Ethernet Controller 1016 for transmission on the Ethernet Interface 805. If the DA of the received Ethernet frame was received from Port 3 1008, and indicated a multicast or broadcast address and the Received-SA-Is-Known-SA flag is False, the Ethernet frame is transferred to the Ethernet Controller 1016 for transmission on the Ethernet Interface 805. If the Received-SA-Is-Known-SA flag is True, the frame is discarded. In addition to a common learning bridge function constructed similar to that specified in the IEEE 802.1D standard, the Bridge Table Processor 1011 sets the Received-SA-Is-Known-SA flag when a query is made 1010 in which the SA appears in the bridge table as a SA learned from Port 1 1015. This mechanism prevents the retransmission of multicast and broadcast Ethernet Frames onto Ethernet Interface 805 that have originated from Ethernet Interface 805.

Upon receiving a packet which is not an Ethernet Frame from Port 3 1008, the Leaf Forwarder 1011 constructs a query 1010 comprised of information obtained from received information 1008, specifically the encapsulation type, the ETYPE, additionally the port number that the packet was received on, and the first 64 octets of the packets data or the entire data if less than 64 octets. The query 1010 is received by the Bridge Table Processor 1011 which performs a table lookup function based upon the information in the query. The Bridge Table Processer 1011 returns a response 1012 to the Leaf Forwarder 1009 comprised of the Forward flag, SA, DA, and the encapsulation type. If the Forward flag is false, the packet is discarded. If the Forward flag is True and if the port number received in the response 1012 is Port 1 1015, the packet and the ETYPE received from Port 3 1008 and SA, and DA information returned in the response 1012 is used to construct an Ethernet Frame which is then transferred to the Ethernet Controller 1015 for transmission on the Ethernet Interface 805. If the port number received in the response 1012 is value 2 or value 0, the packet is discarded. There are no transfers of packets or Ethernet frames from Port 3 1008 to Port 2 1013 for Leaf Forwarders 1009.

Ethernet frames are received over a commonly available Ethernet Interface 805, operating in promiscuous mode, here they are received by a commonly available Ethernet Controller 1016. Ethernet frames are then transferred 1015 to the Leaf Forwarder 1009. Upon receiving a Ethernet Frame from Port 1 1015, the Leaf Forwarder 1009 constructs a query 1010 comprised of information obtained from the Ethernet Frame, specifically the DA, SA, and ETYPE, additionally the port number that the Ethernet frame was received on, the first 64 octets of the Ethernet frame data, and the encapsulation type set to "null". This query 1010 is received by the Bridge Table Processor 1011 which performs a table lookup function based upon the information in the query. The Bridge Table Processer 1011 returns a response 1012 to the Leaf Forwarder comprised of the Forwarding flag, the VPI and VCI values for the ATM virtual connection, and the ATM encapsulation type. If the EtherType value of the Ethernet frame received from the Ethernet Controller 1016 on Port 1 1015, indicated a specific type or set of types, the virtual connection is identified as VC1,11 822 and the Port number set to 2. Otherwise, the virtual connection is identified as VC1,10 813, and the Port number set to 2. This mechanism demonstrates that received Ethernet frames of differing Ethernet types may be transmitted upstream to the controller 802 using via different virtual connections.

The Bridge Table Processor 907 follows the learning bridge forwarding semantics commonly found in the IEEE 802.1D standard. The encapsulation type response is "null" for Ethernet Frames, or "RFC1483-null" if the Ethernet frame contained an Internet Protocol ("IP") datagram and the Internet Engineering Task Force (ETF) RFC1483 standard for null encapsulation was selected, or "RFC1483-LLCSNAP" if the Ethernet frame contained protocol packet of ETYPE and the IETF RFC1483 standard for LLC/SNAP encapsulation was selected. For Ethernet frames received from Port 1, if the response Forward flag is True in 1012, the Ethernet frame, the virtual connection information, and the encapsulation type is communicated 1013 to the ATM AAL5 Segmentation Processor 1014. If the Forward flag value is False, the Ethernet frame is discarded.

The ATM AAL5 Segmentation Processor 1014 is responsible for receiving Ethernet frames, virtual connection, and encapsulation information 1013 from the Leaf Forwarder 1009 and converting the Ethernet data into a stream of ATM cells consistent with the commonly available ATM Adaptation Layer 5 ("AAL5") segmentation semantics. The Ethernet data is processed according to the encapsulation information. The virtual connection information is copied to the VPI and VCI values contained in the ATM cells generated by the process. The ATM cells are then transmitted 1017 to the ATM Cell Scheduler & Cell Queue Memory Processor 1018 (hereafter "Queue Controller").

The Queue Controller 1018 performs a lookup of the virtual connection information 1019 in the Queue Mapping Table 1020 to obtain the queue identifier ("QueueI D") number in which to place the ATM cells. The Queue Controller 1019 then enqueues the appropriate internal cell queue. The Queue Controller 1018 maintains many internal queues in strict priority number and transmits cells 1022 from the highest priority queue which has enqueued cells to the ATM Network Interface 1002 for transmission over the ATM link 1001 to ATM switch #3 803.

The SA information from Ethernet Frames received from Port 1 1015 is used by the Bridge Table Processor 1011 to construct a table which records the source addresses contained in Ethernet Frames received via Port 1 1015. If a query 1010 contains a unicast DA value which matches a recorded SA value in the table, the Forward Flag is set to False in response 1012, indicating that Ethernet Frame should not be forwarded upstream to the Ethernet Root Controller 802. If the SA match is not found or if the DA specifies a multicast or broadcast address, the Forward flag in response 1012 is set to True. It should be recognized that the similarity of Ethernet with the IEEE 802.3 standard and that 802.3 frame processing can be simultaneously supported with Ethernet frame processing.

Figure 11:
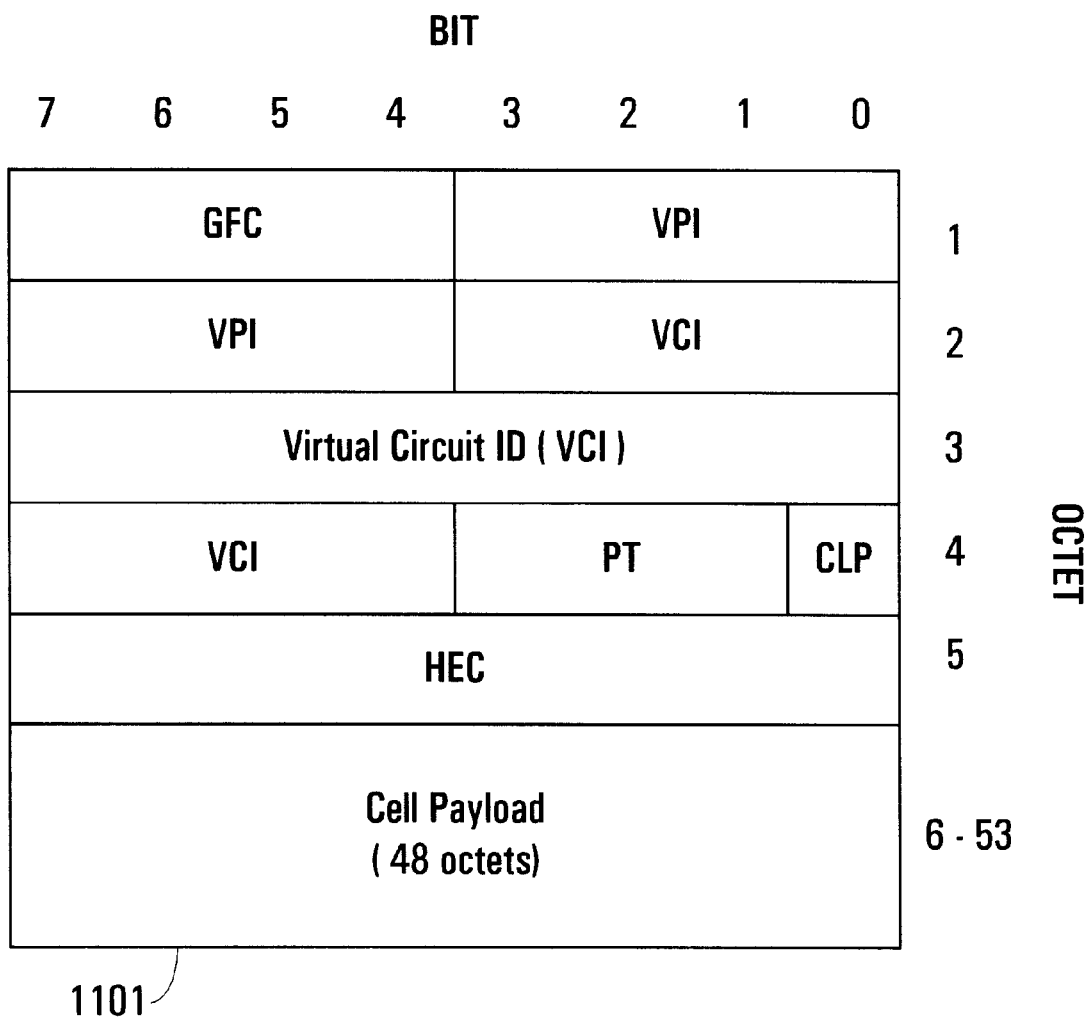
FIG. 11 schematically illustrates the format of a standard ATM User Network Interface (UNI) cell.

FIG. 11 schematically illustrates the format of a standard ATM User Network Interface (UNI) cell. The UNI ATM Cell 1101 is comprised of a total of 53 octets of information, where the first 4 bits is a Generic Flow Control (GFC) field, the next 8 bits are the Virtual Path Identifier, the next 16 bits are the Virtual Circuit Identifier, the next 3 bits are the Payload Type Indicator (PTI) field, the next bit is the Cell Loss Priority (CLP) bit, the next 8 bits is the Header Error Check (HEC) field. The remaining portion of the ATM cell comprises the 48 octet cell payload.

Figure 12:
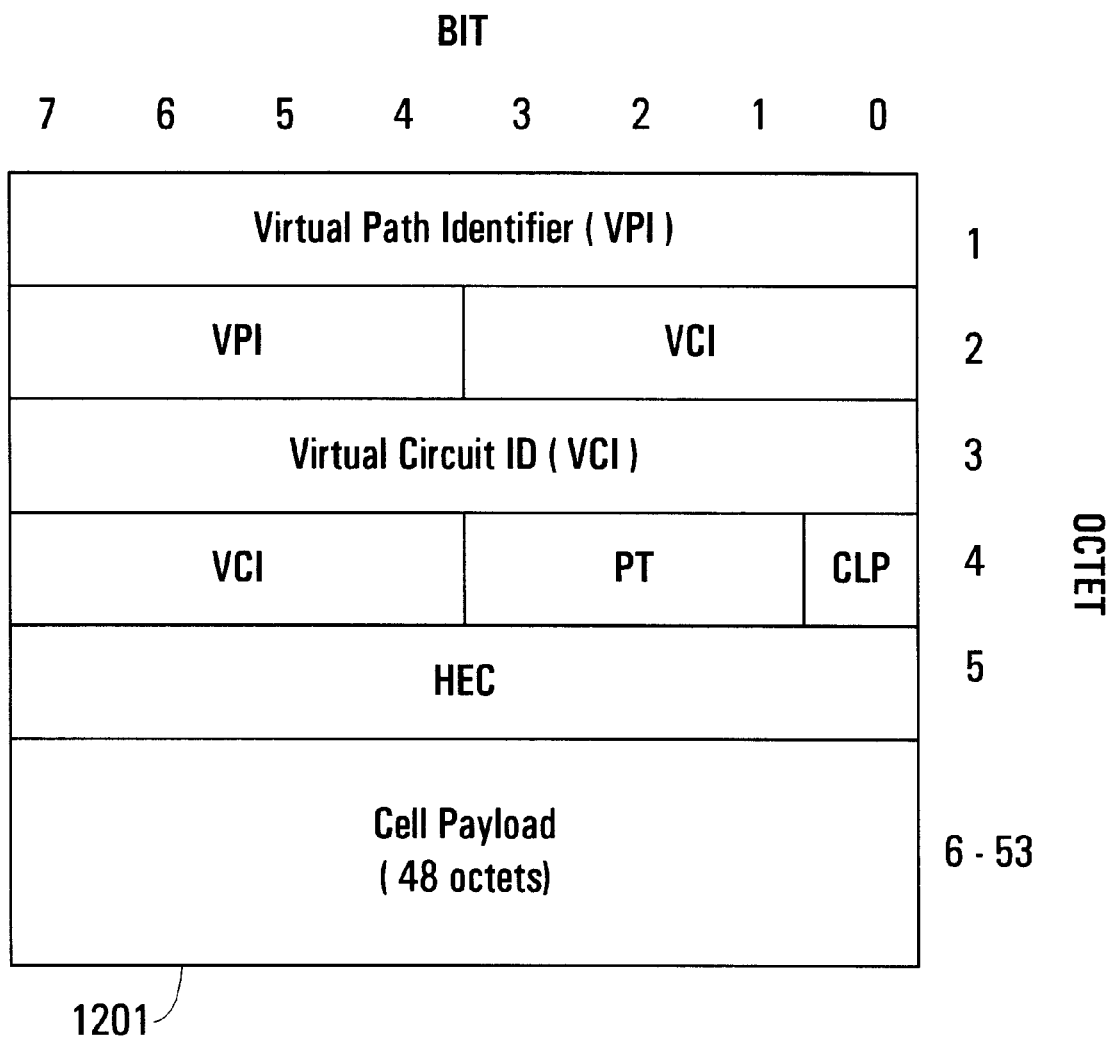
FIG. 12 schematically illustrates the format of a standards ATM Network to Network Interface (NNI) cell.

FIG. 12 schematically illustrates the format of a standards ATM Network to Network Interface (NNI) cell. The UNI ATM Cell 1201 is comprised of a total of 53 octets of information, where the first 12 bits are the Virtual Path Identifier, the next 16 bits are the Virtual Circuit Identifier, the next 3 bits are the Payload Type Indicator (PTI) field, the next bit is the Cell Loss Priority (CLP) bit, the next 8 bits is the Header Error Check (HEC) field. The remaining portion of the ATM cell comprises the 48 octet cell payload.

Figure 13:
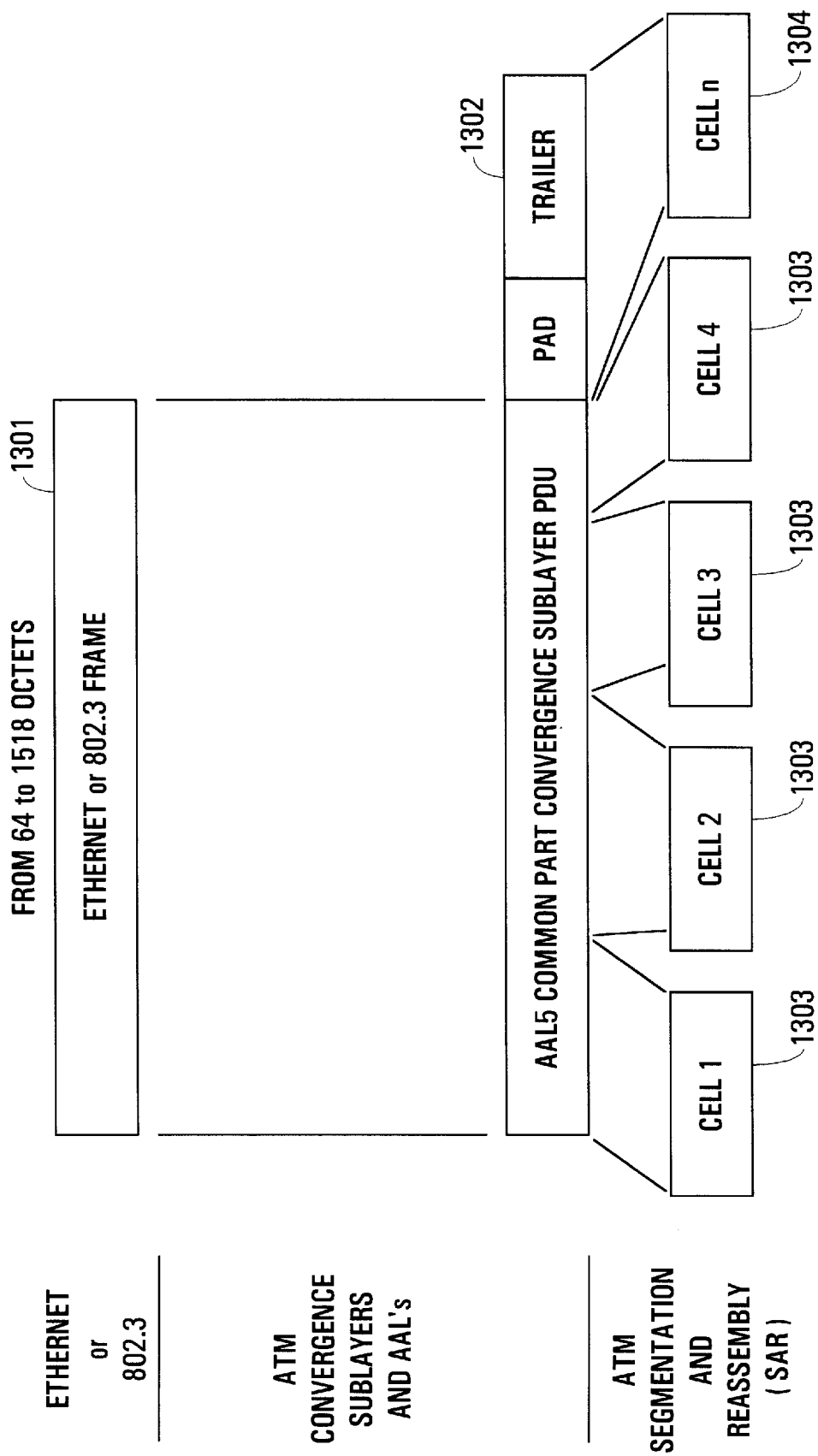
FIG. 13 schematically illustrates the null encapsulation of an Ethernet Frame into an ATM AAL5 Common Part Convergence Sublayer (CPCS) PDU, with pad, and Trailer.

FIG. 13 schematically illustrates the null encapsulation of an Ethernet Frame 1301 into an ATM AAL5 Common Part Convergence Sublayer (CPCS) PDU, with pad, and Trailer 1302. The variable length Ethernet Frame is placed into the AAL5 CPC5 PDU. The AALS trailer contains both a CPCS PDU length value and a 32 bit (4 octet) Cyclic Redundancy Check (CRC) value. The length of the pad is adjusted according the standard AAL5 semantics so 4 octets of CRC in the trailer align with the last four octets of the last ATM cell payload which contains the CPCS PDU. An AAL5 CPCS PDU may be segmented in UNI or NNI ATM Cells 1303 and 1304. The ATM cell 1304 which holds the trailer has a special bit set in the PTI field (specifically, the SDU-type bit) which indicates the trailer is present in the payload. The segmentation process decomposes the AAL5 PDU into one or more ATM cells 1303 and 1304, depending on the length of the CPCS PDU. In the reverse process, the reassembly process, reconstructs the CPCS PDU from a stream of ATM cells 1303 and 1304. The CRC in the CPCS trailer is used to detect the correct reception of the CPCS PDU. ATM standards dictate that ATM cells are sent in order through the ATM network and the transmission order may not be rearranged. It should be noted that the method of encapsulating Ethernet in ATM AAL5 and selecting virtual connection and quality of service based on Destination Address and Ethernet Type can be extended to directly to support other networking protocols, such as IP, IPX, and Appletalk. Moreover, the encapsulation method as described in the IETF RFC1483 standard, virtual connection, and quality of service selection can be based on information contained in the headers or data of these other protocols.

It is the assertion of this detailed embodiment that the methods presented in the description of this Distributed Hierarchic Ethernet Switch provide a system of operation between the Ethernet Interface 801 and all Ethernet Interfaces 805 consistent with the operation of a commonly available multiple port Ethernet switching hub. In other words, unicast, multicast, and broadcast Ethernet frames are directed to the appropriate Ethernet Interface or Ethernet Interfaces 801 and 805, regardless of which Ethernet Interface 801 and 805 received the Ethernet frame. Furthermore, it has been shown that different virtual connections may be used for the downstream transfer. Ethernet frames of differing Ethernet Types between the controller 802 and the Ethernet Leaf Processor #1 804 and that the Quality of Service and priority of ATM virtual connections may be separately specified on a per downstream virtual connection basis.

Different virtual connections may be used for the upstream transfer Ethernet frames of differing Ethernet Types from the same Ethernet Leaf Processor #1 804 controller 802 and that the Quality of Service and priority of ATM virtual connections may be separately specified on a per upstream virtual connection basis. In addition, it has been shown that Ethernet frames may received from an Ethernet interface 801 and encapsulated based on Ethernet Type or other non-Ethernet protocol header data, then segmented into ATM cells, then transmitted on a virtual connection by controller 802 downstream to the Ethernet Leaf Processor #1 804 and reconstituted into an Ethernet frame via the Leaf Forwarder 1009. This is based on information associated with the virtual connection in the Bridge Table Processor 1011. The Ethernet Frame may be transferred to the Ethernet controller 1016 for transmission on the Ethernet Interface 805. The Quality of Service and priority of ATM virtual connections may be separately specified on a per downstream virtual connection basis.

It has been shown that Ethernet frames may received from an Ethernet interface 805 and encapsulated based on Ethernet Type or other non-Ethernet protocol header data, then segmented into ATM cells, then transmitted on a virtual connection by Ethernet Leaf Processor #1 804 to controller 802 upstream and reconstituted into an Ethernet frame via the Root Forwarder 902. This is based on information associated with the virtual connection in the Bridge Table Processor 907. The Ethernet Frame may be transferred to the Ethernet controller 901 for transmission on the Ethernet Interface 801, and that the Quality of Service and priority of ATM virtual connections may be separately specified on a per upstream virtual connection basis. It is the assertion that the operations described for the Ethernet Controller 802 and Ethernet Leaf Processor #1 804 are applicable for any Ethernet Leaf Processor.

Figure 14:
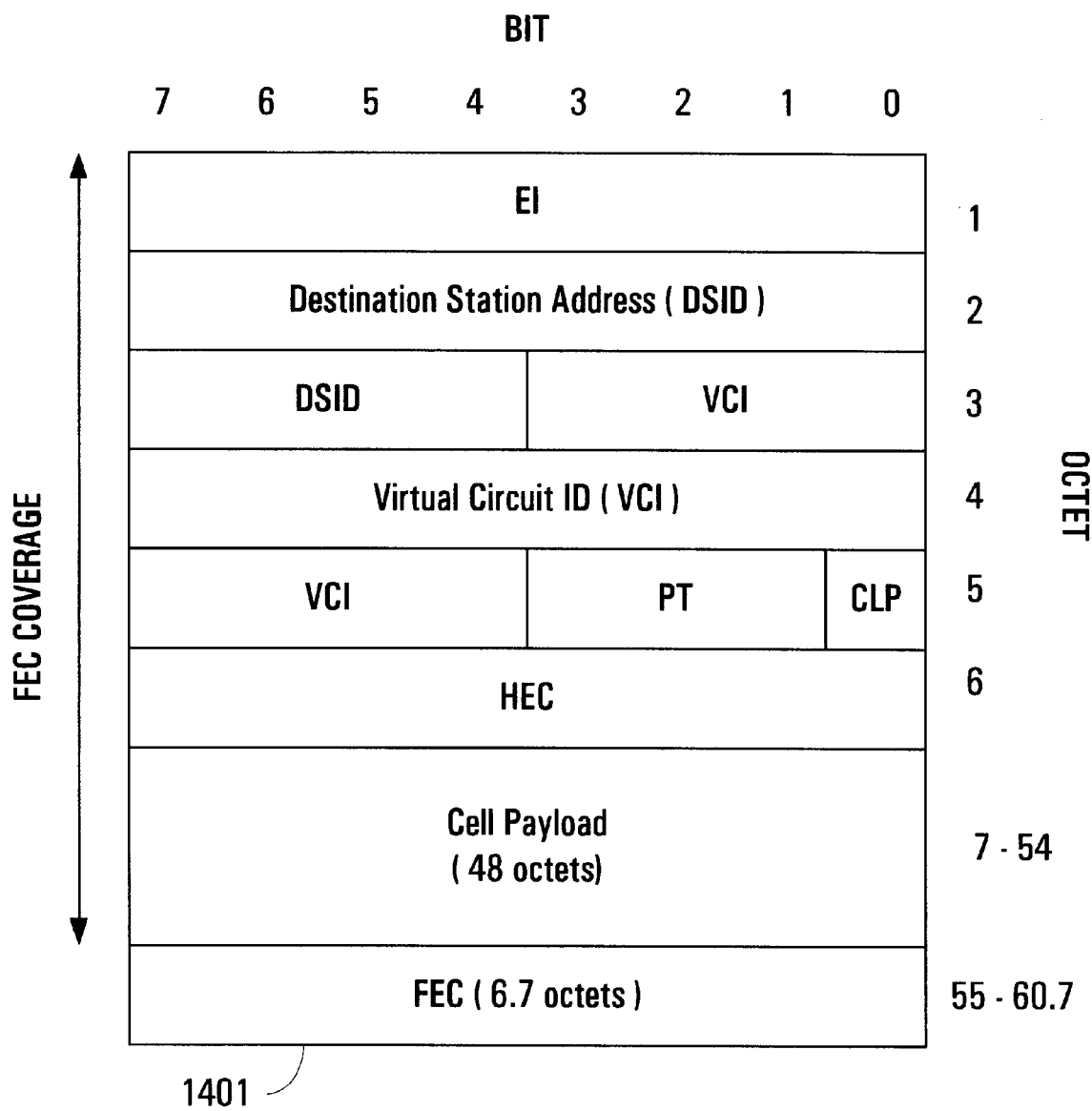
FIG. 14 shows a downstream slot structure.

FIG. 14 shows a downstream slot structure. The Encryption Index (EI) is an 8-bit value conveying a four valued indication of the encryption status of the ATM PDU. A value of <0x00> means that the ATM PDU is not encrypted, <0x55> means encrypted with key 1, <0xAA> means encrypted with key 2, and <0xFF> means encrypted with key 3. An encryption key table is kept for each station identifier (individual or group) used by the station to identify ATM cells that it should receive. The Destination Station ID (DSID) is 12 bits long. This is the station identifier of the stations(s) to receive the ATM cell. The DSID overlays the Virtual Path Identifier of the ATM NNI cell header. The Virtual Circuit Index (VCI) is a 16-bit ATM Forum UNI 3.1 VCI field. The 3-bit Payload Type (PT) is the ATM Forum UNI 3.1 field. It occupies bits 2–4 of octet 11 of the downstream slot. The Payload Type bits follow the ATM UNI 3.1 specifications:

TABLE 1

Payload Type Indicator Encoding

| PTI Coding (MSB first) | Interpretation |
|---|---|
| 000 | User data cell; congestion not experienced, SDU-type = 0 |
| 001 | User data cell, congestion not experienced, SDU-type = 1 |
| 010 | User data cell, congestion experienced, SDU-type = 0 |
| 011 | User data cell, congestion experienced, SDU-type = 1 |
| 100 | Segment OAM F5 flow related cell |
| 101 | End-to-end OAM F5 flow related cell |
| 110 | Reserved for future traffic control and resource management |
| 111 | Reserved for future functions |

The single Cell Loss Priority (CLP) bit is the UNI 3.1 CLP bit which occupies bit 1 of octet 11 of the downstream slot. A CLP bit=0 indicates a higher priority traffic cell and a CLP bit=1 indicates a lower priority cell. Upon entering the overall system, a cell with CLP=1 may be subject to discard depending on network traffic conditions. The Header Error Control (HEC) is a standard ATM cell HEC field. The actual data is contained in the Cell Payload (PDU), which is 48 octets in length. This corresponds to the normal ATM cell PDU. Finally, 6.7 octets of forward error correction are provided.

Figure 15:
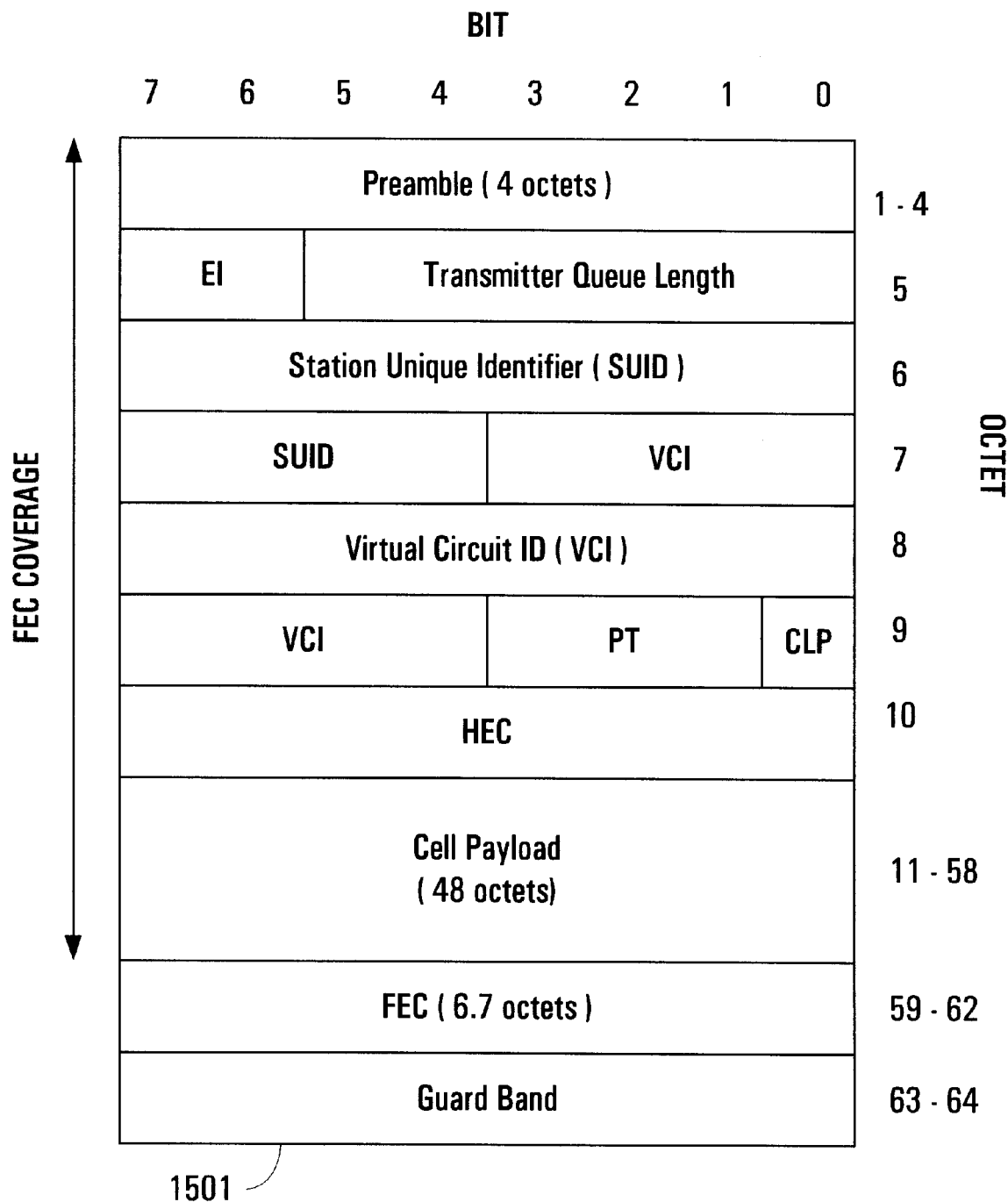
FIG. 15 shows an upstream slot structure.

FIG. 15 shows an upstream slot structure. The Preamble is 4 octets in length and consists of a series of ones and zeros used to help identify the beginning of a cell slot. The preamble contains a pattern which provides the receiver with an identification of the start of valid data, beginning with the EI bits. The two-bit Encryption Index (EI) 2 bits) conveys a four valued indication of the encryption status of the ATM PDU. A value of <0b00> means that the ATM PDU is not encrypted, <0b01> means encrypted with key 1, <0b10> means encrypted with key 2, and <0b11> means encrypted with key 3. A three-key index is kept for each the station address and each multicast group address of which the station is a member. The Transmitter Queue Length (TQL) is 6 bits and is obtained from the queue length on line 702 of FIG. 7. The station places the length (as measured in slots) of the transmit queue. This field is used to communicate a bandwidth request to the head-end controller. The TQL value range is <0x00> through <0x3F>. The Station Unique Identifier (SUID) is a 12-bit value which is the station unique identifier of the source station of this slot; i.e., the station that transmitted this ATM cell. The Virtual Circuit Index (VCI) is (16 bits) corresponding to an ATM Forum UNI 3.1 VCI field. The Payload Type (PT) is 3 bits and corresponds the ATM Forum UNI 3.1 field. The PT field occupies bits 2–4 of octet 11 of the upstream slot. The Cell Loss Priority (CLP) bit corresponds to the UNI 3.1 CLP bit. The CLP bit occupies bit 1 of octet 11 of the upstream slot. A CLP bit=0 indicates a higher priority traffic cell and a CLP bit=1 indicates a lower priority cell. Upon entering the system, a cell with CLP=1 may be subject to discard depending on network traffic conditions. The Header Error Control (HEC) corresponds to a standard ATM cell HEC field, and the Cell Payload (PDU) (48 octets) corresponds to a normal ATM cell PDU. The Forward Error Correction field is 4 octets which contain a 4-byte FEC which covers octets 4 through 59 of the upstream slot. The FEC type is RS (54,58). Finally, the Guard Band is 2 octets. This dead zone is the transmitter guard band between cell bursts.

Figure 16:
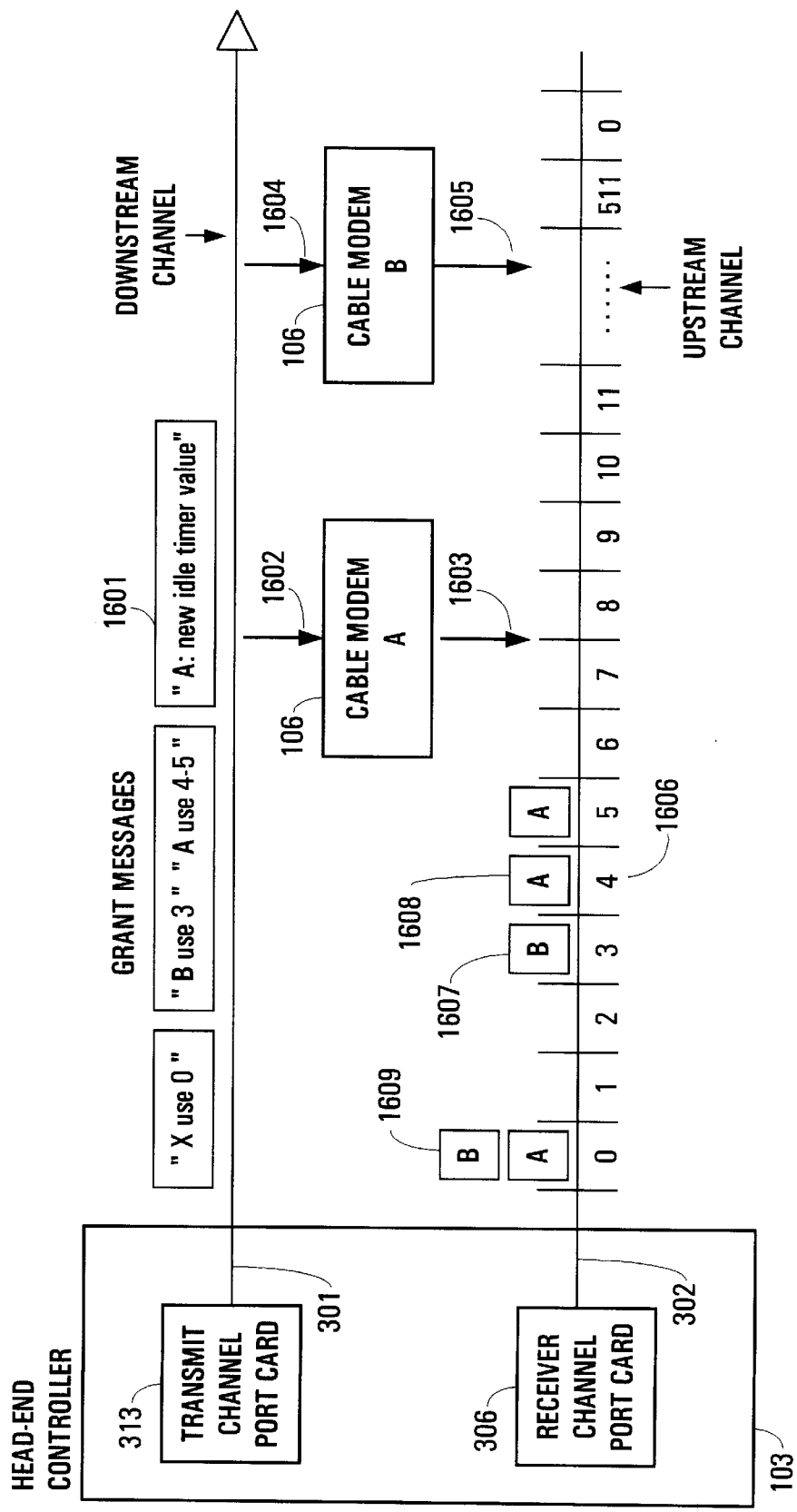
FIG. 16 schematically illustrates an upstream channel that has been organized into slots which may be assigned for the transmission of ATM cells from a first cable modem A or a second cable modem B.

FIG. 16 schematically illustrates an upstream channel 302 that has been organized into slots 1606 which may be assigned for the transmission of ATM cells from cable modem A 106 or cable modem B 106. The slots on the upstream channel are numbered in ascending order beginning at 0 up to 511 (decimal) and then the count is repeated starting at 0. Common techniques for ranging the cable modems 106 produce a timing alignment condition such that if two modems are both instructed to simultaneously transmit an ATM cell in the same slot n, where n is one integer value selected from 0 to 511, the first bit from each cable modem transmission 1603 and 1605 would arrive at the head end receiver port 306 at the same time, within minium time jitter 1609. If one modem were assigned to transmit in slot n and the other in the next adjacent slot j, where j=n+1 masked with hex value 1FF (511 decimal), the two individual transmissions would be separately discernible by the receiver port 306. Further, the head end controller 103, via the transmitter port card 313 and downstream channel 301, issues grant messages 1601 to cable modems via their receivers 1602 and 1604. The contents of the grant message contain individual grants that are directed to specific cable modems. Grant message 1601 contains a special grant "X", called a contention grant, which gives permission for any modem to transmit in slot 0, a direct grant for Cable Modem B 106 to transmit one ATM cell in slot 3 and a direct grant for Cable Modem B 106 to transmit two ATM cells, in slots 4 and 5, and a null grant which instructs cable modem A 106 to update its idle timer value. The direct grant messages are received by the Cable Modem B 106 such that its ATM cell is appropriately transmitted in upstream slot 3 1607 and received by Cable Modem B 106 such that its ATM cells are appropriately transmitted in slots 4 and 5 1608. It is asserted that the Grant Message 1601 mechanism can be extended to an arbitrary number of individually identified Cable Modems 106 which receive messages via the same downstream channel 301 such that sharing of the slotted upstream channel 302 is accomplished under direction of grants being issued from the head end controller 103.

It is asserted that the specific upstream channel access slot counting mechanism of counting from 0 to 511 then repeating to 0 can be generalized to any 6 slot counting method employing a repeating integer counting range where all cable modems on the same upstream channel share the starting integer and notion of the integer value on which to begin repeat count. Furthermore, in a slot grant system, the assignment of slots on a fixed repeating interval or at a fixed distance (e.g., n=n+10), yields a constant bit rate service rate to the cable modem. Further, it is asserted that while constant bit rate allocations are being granted, the unused slots on the upstream channel can be assigned to any cable modem on a dynamic basis, thereby assigning additional variable bandwidth to any cable modem. In one embodiment, the mixture of constant bit rate and variable bit rate allocations are scheduled on the same upstream channel.

Figure 17:
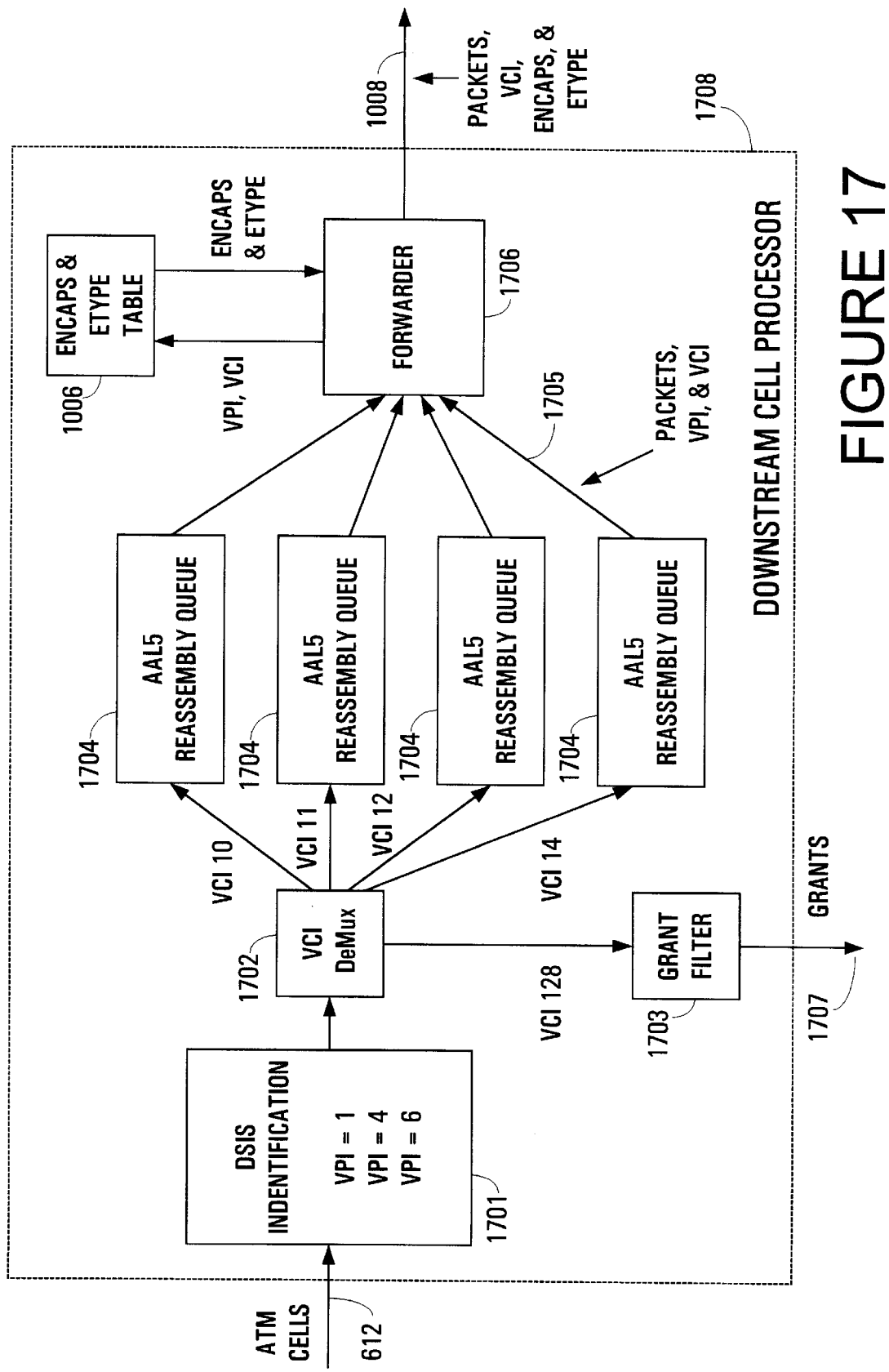
FIG. 17 is a circuit diagram showing the functions and interactions corresponding to a VPI selector and a VC demultiplexer of an STU for handling incoming ATM cells.

FIG. 17 is a circuit diagram showing the functions and interactions corresponding to a VPI selector and a VC demultiplexer of an STU for handling incoming ATM cells on line 612. This combination of circuits is called the downstream cell processor 1708. The ATM cell stream output from the cell delineation, HEC verification, and DES decoding blocks is input to the Destination Station ID (DSID) identification circuit 1701. The function of the DSID circuit 1701 is to determine which of the ATM cells are to be accepted and which are to be discarded. The STU has been preprogrammed to identify certain VPI values. One of these VPI values corresponds to the Station Unique Identifier (SUID). The selection process is determined according to the VPIs contained in each individual ATM cell as compared against the preprogrammed VPI values. Only those ATM cells with a VPI value matching the preprogrammed VPI values are retained. Other ATM cells are ignored. In this example, only those cells having VPIs of 1, 4, and 6 are retained for processing. VPI 1 may correspond to a unicast mode, whereby only this particular STU receives ATM cells with a VPI 1 value (i.e., the SUID value). The VPI 1 value is unique to his particular STU. A VPI 6 may correspond to a broadcast mode, whereby it is intended that all STUs are to receive the ATM cell. One or more VPIs can be programmed into the STU so that it accepts multicast ATM cells. For example, VPI 4 may correspond to multicast ATM cells, whereby this particular STU belongs to a specific group of STUs which have been programmed to accept ATM cells with a VPI value of 4.

If the DSID identification circuit 1701 determines a match between the preprogrammed VPI values and the VPI field of the ATM cell, that particular ATM cell is routed for further processing by the VCI demultiplexer 1702. The VCI demultiplexer 1702 routes the ATM cell to one of several different circuits within the STU, depending on its VCI value. One such VCI value (e.g., VCI 128) causes the ATM cell to the grant filter 1703. Grant filter 1703 filters the direct, contention, and null grants sent by the headend controller. The grants are then sent on for further processing via line 1707. Certain VCI values (e.g., VCI 10–14) cause the ATM cell to be sent to one of several Ethernet AAL5 reassembly queues 1704 which reassembles Ethernet frames which have been null encapsulated in an AAL5 stream into Ethernet packets. The reassembled Ethernet packets are sent via lines 1705 to the forwarder 1706. Based on the VPI, VCI values, the encapsulation and etype table 1006 provides the appropriate encapsulation and etype information to the forwarder 1706. The resulting packets, VCI, encapsulation, and etype information is then output on line 1008.

Figure 18:
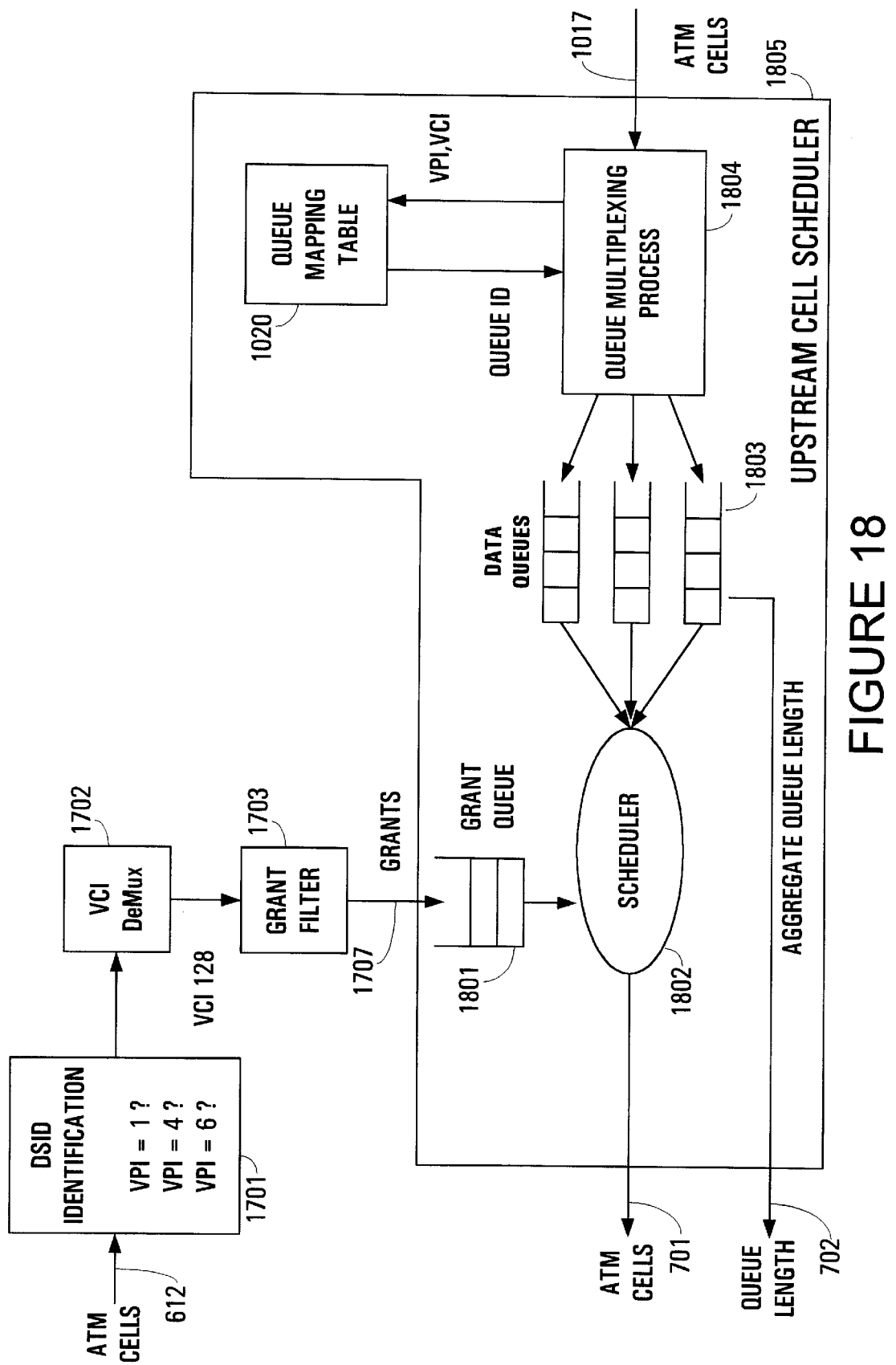
FIG. 18 shows a circuit diagram of an upstream cell scheduler corresponding to an STU.

FIG. 18 shows a circuit diagram of an upstream cell scheduler 1805 corresponding to an STU. There are two inputs associated with enabling the STU to perform upstream transmrissions. First, special virtual connections on line 612 are used specifically for grants (e.g., direct, contention, and null).

Grant cells designated for this particular STU are identified by their VPIs by the DSID identification circuit 1701. The VCI demultiplexer 1702 routes the grant cells to the grant filter 1703 according to the VCI value (e.g., VCI 128) and then to the grant queue 1801 via line 1707. The queued grants are dispensed to the scheduler 1802 which schedules ATM cells for upstream bound transmissions over line 701 according to the slotted transmission process of FIG. 16. The actual data to be transmitted is input on line 1017 to the queue multiplexing process 1804. By referencing the VPI, VCI values into a queue mapping table 1020, a queue ID is determined. The queue ID allows the queue multiplexing process to prioritize ATM cells on an individual basis into the various cell queues 1803. Eventually, the ATM cells stored in the cell queues 1803 are cleared for transmission by scheduler 1802. Furthermore, the aggregate queue length of the ATM cells awaiting transmission in the data queues 1803 are sent to the headend controller via line 702.

Figure 19:
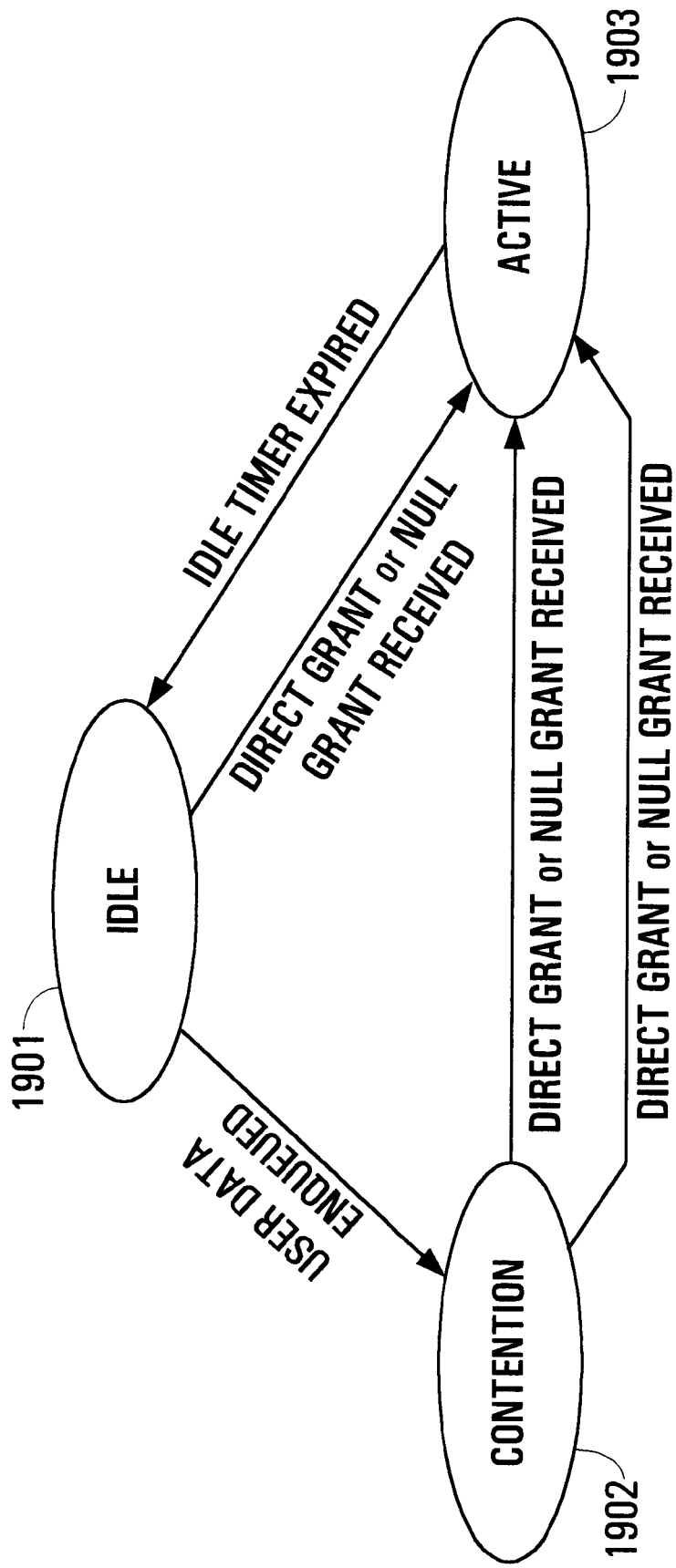
FIG. 19 shows a flow diagram associated with an STU.

FIG. 19 shows a flow diagram associated with an STU. Basically, there are three states: idle 1901, contention 1902, and active 1903. The IDLE state 1901 signifies that the STU has an empty grant queue and has not been active for a period of time. While in the IDLE state 1901, the STU may enqueue contention grants in the grant queue 1801. If an IDLE station receives a direct grant, it flushes the grant queue, enqueues the directed grant, and enters the ACTIVE state 1903. If the station receives a null grant, it updates the Idle Timer, and transitions to the ACTIVE state 1903. In the ACTIVE state 1903, the STU has one or more enqueued direct grants in its grant queue 1801. It is also transmitting data from its upstream transmit queue in the upstream slots as specified in the direct grants. While in the ACTIVE state 1903, the grant filter 1703 is only permitted to enqueue direct grants. However, if an ACTIVE station receives a direct grant and it has no data in its upstream transmit queue, it transmits idle cells in the slots allocated in the grant. An STU idle cell is indicated by the SUID/VPI value set to the station ID. The VCI should also be set to the same VCI used for downstream grants. The upstream HEC value must be correct. The station then remains in the ACTIVE state 1903. When the grant queue becomes empty, the station starts the Idle Timer. If the timer expires, the STU enters the IDLE state 1901. The idle timer is disabled whenever there is at least one direct grant enqueued on grant queue 1801. The value of the timer is set via management message by the head-end controller. If the STU receives a null grant, it updates the Idle Timer and remains in the ACTIVE state 1903.

The STU uses a directed exponential backoff process to decide when it transmits its next idle cell. That is, before transmitting its next idle cell, the station delays some number of contention grant slots before attempting to retransmit the idle cell. The delay is an integer number of contention grant slots. The number of slots to delay before the next retransmission of an idle cell is chosen as a uniformly distributed random integer r in the range: $0 \leq r < 2^k$. This is referred to as the contention backoff range. The value "k" is set by the head-end controller via a special message sent to the STU. Note that the head-end controller may change "k" at any time appropriate to the number of stations it perceives is contenting.

If the station has traffic enqueued in any of the cell queues 1803, the station counts contention slot grants as they pass into the grant queue 1801 and expire as unused. However, if the number of slots equal "r" the station must transmit an idle cell in the slot indicated in the contention grant. Note that upon entering the CONTENTION state 1902, the STU must first compute its backoff count and then wait that number of contention slot opportunities before transmitting an idle (contention) cell. There is no immediate send mode for the CONTENTION state 1902. It should also be noted that the head-end controller allocates contention slots as needed by its observation of the aggregate traffic needs of the system. The STU's state machine in contention mode is driven solely by the arrival of a contention grant message in the grant queue. Note also that the values given above define a behavior that an STU may exhibit in attempting to retransmit after an inferred collision. If the STU receives a direct grant, it flushes the grant queue, enqueues the direct grant, and enters the ACTIVE state 1903. If the STU receives a null grant, it flushes the grant queue, updates the Idle Timer, and enters the ACTIVE state 1903. In the foregoing description, the null grant is used to update the STU's Idle Timer. This function is used by the headend controller to delay the STU from entering the Idle State 1901 appropriate to the headend controller's anticipated transmission of a direct grant to that particular STU.

Figure 20:
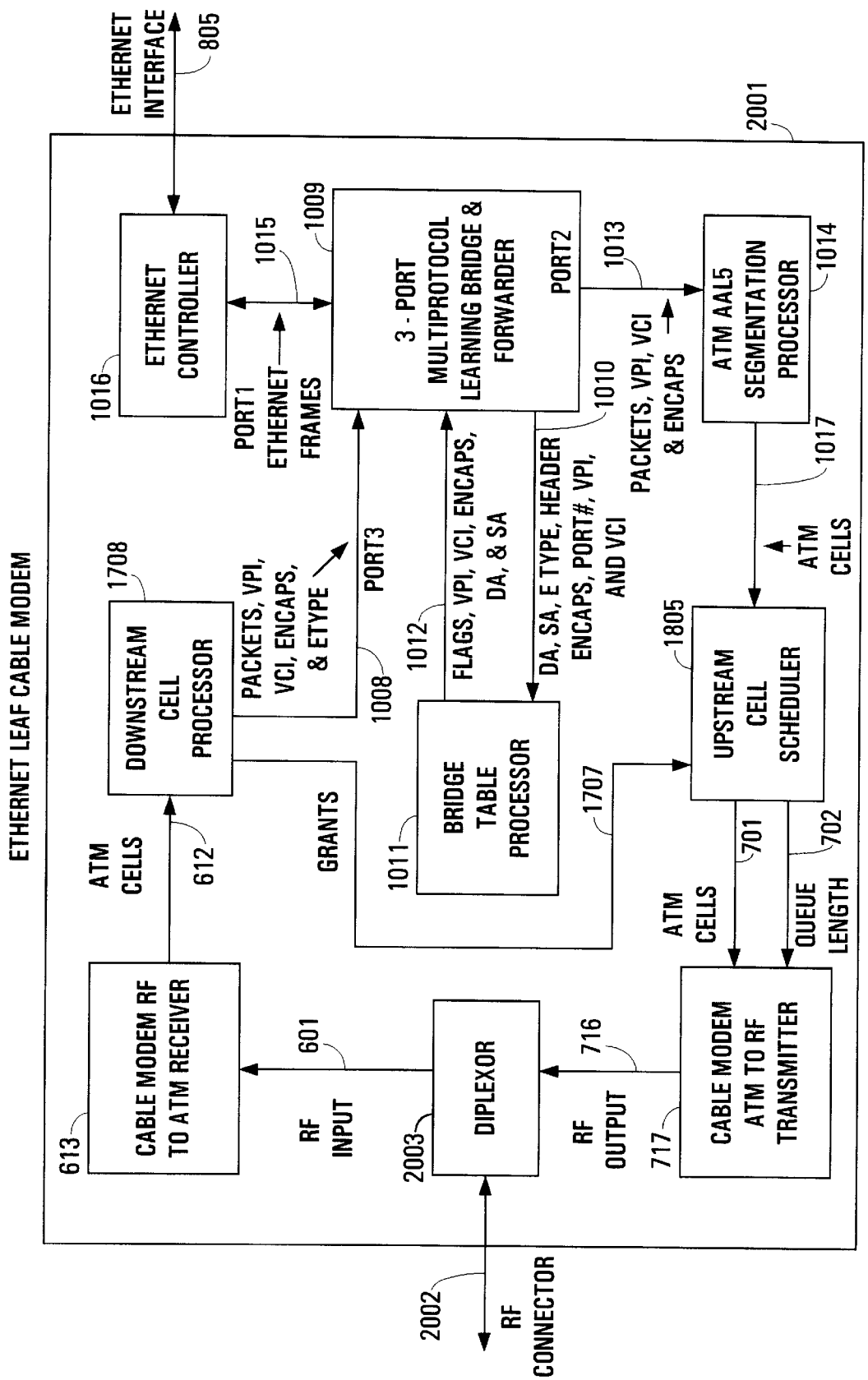
FIG. 20 shows a block diagram of an Ethernet Leaf Cable Modem 2001.

FIG. 20 shows a block diagram of an Ethernet Leaf Cable Modem 2001. This figure is equivalent to that shown in FIG. 10, except that the ATM based Ethernet Leaf Processor that had been connected to an ATM switch is now adapted to an RF connected cable leaf modem. The RF connected cable leaf modem exhibits the same behavioral semantics as described with reference to FIG. 10. The three new blocks included in FIG. 10 that was not shown in FIG. 10 include the downstream cell processor 1708, cable modem RF to ATM receiver 613, and diplexor 2003. The downstream cell processor 1708 has been described in reference to FIG. 17. Its output is the same as that of the ATM AAL5 reassembly processor 1004 of FIG. 10. They are functional equivalents. The cable modem RF to ATM receiver was described in reference to FIG. 6. The diplexor 2003 is a common high pass/low pass type filter coupler that routes the downstream RF input to receiver 613 while routing the RF output from the transmitter 717 upstream.

Additional details are presented in "The UPSTREAMS Protocol for HFC Networks" proposal which was submitted to an IEEE committee as IEEE P802.14-95/152 and which is referenced herein. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A cable network comprising:
   one or more cables for conveying radio frequency signals;
   a plurality of cable modems coupled to the plurality of cables, wherein the cable modems accept data packets, convert the packet data into asynchronous transfer mode cells which are transmitted by radio frequency over the cables;
   a headend controller coupled to the cables for accepting the radio frequency signals transmitted by the plurality of cable modems and wherein the headend controller sends one or more radio frequency signals containing asynchronous transfer mode cells over the cables to the plurality of cable modems according to virtual connection information assigned to individual cells;
   a network interface coupled to the headend controller for inputting packet data to the headend controller and receiving packet data from the headend controller;
   a converter coupled to the headend controller which converts packet data from the network interface into asynchronous transfer mode cells for transmission by the headend controller to the plurality of cable modems and also converts asynchronous transfer mode cells generated by the cable modems and received by the headend controller into packet data for output by the network interface, wherein the asynchronous transfer mode cells contain video, audio or textual information such that cells are prioritized in order for transmission according to each individual cell's delay sensitivity;
   a shared media which is used to establish a downstream channel from the headend controller to the plurality of cable modems and to establish a plurality of upstream channels from the plurality of cable modems to the headend controller;
   a contention resolution circuit within the headend controller for resolving contentions which may arise according to a directed exponential backoff scheme with implicit feedback.

2. The cable network of claim 1 further comprising encryption circuitry for encrypting ATM cell payloads.

3. A cable network comprising:
   one or more cables for conveying radio frequency signals;
   a plurality of cable modems coupled to the plurality of cables, wherein the cable modems accept data packets, convert the packet data into asynchronous transfer mode cells which are transmitted by radio frequency over the cables;
   a headend controller coupled to the cables for accepting the radio frequency signals transmitted by the plurality of cable modems, wherein the headend controller sends one or more radio frequency signals containing asynchronous transfer mode cells over the cables to the plurality of cable modems according to virtual connection information assigned to individual cells and wherein the headend controller further comprises a null-grant circuit for minimizing contention, wherein a null-grant signal is transmitted to acknowledge and remove a requesting cable modem from contention for a pre-determined amount of time;
   a network interface coupled to the headend controller for inputting packet data to the headend controller and receiving packet data from the headend controller;
   a converter coupled to the headend controller which converts packet data from the network interface into asynchronous transfer mode cells for transmission by the headend controller to the plurality of cable modems and also converts asynchronous transfer mode cells generated by the cable modems and received by the headend controller into packet data for output by the network interface, wherein the asynchronous transfer mode cells contain video, audio or textual information such that cells are prioritized in order for transmission according to each individual cell's delay sensitivity;
   a shared media which is used to establish a downstream channel from the headend controller to the plurality of cable modems and to establish a plurality of upstream channels from the plurality of cable modems to the headend controller.

4. The cable network of claim 3, wherein the headend controller identifies a virtual path for routing an asynchronous transfer mode cell to a specific set of cable modem(s).

5. The cable network of claim 3, wherein the packet data correspond to Ethernet format.

6. The cable network of claim 3, wherein there are a plurality of upstream channels and a plurality of downstream channels between the headend controller and the cable modems.

7. A cable modem for transmitting and receiving RF signals over a cable network, comprising:
   a computer interface for handling packet data between the cable modem and a computer;
   a processor coupled to the computer interface for converting the packet data into ATM cells and for converting ATM cells to data packets;

an RF transmitter coupled to the processor for generating RF signals conveying ATM cell information to a headend controller, wherein the computer generates packet data which are converted into ATM cells and transmitted over the cable network as RF to the headend controller and wherein the ATM cell information contains video, audio, or textual information and individual cells are prioritized according to their respective sensitivity for incurred delays;

an RF receiver coupled to the processor for receiving RF signals having ATM cell information from the headend controller, wherein the headend controller broadcasts RF signals over the network which are received by the cable modem according to virtual connection information assigned to individual cells, converted into packet data and output to the computer;

a shared medium is used to establish a downstream channel from the headend controller to the cable modem and to establish an upstream channel from the cable modem to the headend controller;

a contention circuit for handling contentions according to a directed exponential backoff scheme with implicit feedback.

8. The cable modem of claim 7 further comprising encryption circuitry for encrypting ATM cell payloads associated with transmissions.

9. The cable modem of claim 7 further comprising a circuit for recognizing a null-grant signal generated by the headend controller, wherein the null-grant signal minimizes contention by acknowledging that the cable modem has indicated a request to transmit and removes the cable modem for a pre-determined amount of time.

10. The cable modem of claim 7, wherein RF signals are received by the cable modem according to a virtual path identifying the cable modem as belonging to a specific set of cable modem(s).

11. The cable modem of claim 7, wherein the packet data correspond to Ethernet packets.

12. A headend controller comprising:
a headend controller for transmitting RF signals over a cable network to a plurality of subscriber units and for receiving a plurality of RF signals from the subscriber units, comprising:
a network interface for handling packet data between the headend controller and a computer network;
a processor coupled to the network interface for converting the packet data into ATM cells and for converting ATM cells to data packets;
an RF transmitter coupled to the processor for generating RF signals conveying ATM cells according to virtual connection information assigned to individual cells for routing to the plurality of subscriber units, wherein the network interface accepts packet data which are converted into ATM cells and transmitted over the cable network as RF to designated subscriber units and wherein the ATM cells contain video, audio, or textual information which are prioritized for transmission on a cell basis according to an individual cell's sensitivity for incurred delays;
an RF receiver coupled to the processor for receiving RF signals having ATM cell information from the plurality of subscriber units, wherein the subscriber units transmit RF signals over the cable network to the headend controller which converts the RF signals into packet data for output to the computer network;
a shared medium is used to establish a downstream channel from the headend controller to the cable modems and to establish a plurality of upstream channels from the cable modems to the headend controller;
a contention circuit for handling contentions according to a directed exponential backoff scheme with implicit feedback.

13. The headend controller of claim 12 further comprising encryption circuitry for encrypting an ATM cell payload.

14. The headend controller of claim 12 further comprising a circuit for generating a null-grant signal to minimize contention by acknowledging that the cable modem has indicated a request to transmit and removing that cable modem from contention for a pre-determined amount of time.

15. The headend controller of claim 12, wherein one or more cable modems are identified according to a virtual path established by the headend controller.

16. The headend controller of claim 12, wherein the packet data correspond to Ethernet data packets.

17. A method of providing two-way communications between a headend controller and a plurality of cable modems comprising the step of:
the headend controller:
accepting ethernet data from a first device coupled to the headend controller;
converting the ethernet data into ATM data containing video, audio, or textual information which are prioritized according to their respective sensitivity toward incurred delays;
assigning virtual connection information to individual cells which is used to prioritize and route the cells to one or more of the cable modems;
transmitting the ATM data as RF over a shared medium to the plurality of cable modems;
the designated cable modem;
receiving the ATM data generated by the headend controller;
converting the ATM data into ethernet data;
supplying the ethernet data to a second device coupled to the designated cable modem;
converting ethernet data generated by the second device into ATM data for transmission as RF over the shared medium to the headend controller;
generating control information for managing transmissions by the cable modems, wherein the control information is sent in ATM cells;
establishing a downstream channel from the headend controller to the cable modems and a plurality of upstream channels from the cable modems to the headend controller;
resolving contentions according to a directed exponential backoff scheme with implicit feedback.

18. The method of claim 17 further comprising the step of encrypting ATM payload data for providing secure transmissions.

19. The method of claim 17, wherein one or more cable modems are identified according to a virtual path established by the headend controller.

20. The method of claim 17, wherein the packet data corresponds to an Ethernet packet data.

21. The method of claim 17 further comprising the step generating control information for managing transmissions by the cable modems, wherein the control information is set in ATM cells.

22. The method of claim 17, wherein the ATM data contain video, audio, or textual information which are prioritized according to their respective sensitivity toward incurred delays.

23. The method of claim 17, wherein a shared medium is used to establish a downstream channel from the headend controller to the cable modems and to establish a plurality of upstream channels from the cable modems to the headend controller.

24. A method of providing two-way communications between a headend controller and a plurality of cable modems comprising the step of:

the headend controller:

accepting ethernet data from a first device coupled to the headend controller;

converting the ethernet data into ATM data containing video, audio, or textual information which are prioritized according to their respective sensitivity toward incurred delays;

assigning virtual connection information to individual cells which is used to prioritize and route the cells to one or more of the cable modems;

transmitting the ATM data as RF over a shared medium to the plurality of cable modems;

the designated cable modem:

receiving the ATM data generated by the headend controller;

converting the ATM data into ethernet data;

supplying the ethernet data to a second device coupled to the designated cable modem;

converting ethernet data generated by the second device into ATM data for transmission as RF over the shared medium to the headend controller;

generating control information for managing transmissions by the cable modems, wherein the control information is sent in ATM cells;

establishing a downstream channel from the headend controller to the cable modems and a plurality of upstream channels from the cable modems to the headend controller;

generating a null-grant signal to minimizes contention by acknowledging that one of the cable modems has indicated a request to transmit and removing that cable modem from contention for a pre-determined amount of time.

25. A method for data communication between a headend controller coupled to a plurality of cable modems, comprising the steps of:

establishing by the headend controller, a set of one or more virtual connections between the headend controller and a set of one or more cable modems;

sending an ATM cell by the headend controller through a cable network to the plurality of cable modems;

the set of one or more cable modems receiving the ATM cell associated with a specific virtual connection;

establishing a virtual connection to distribute grant instruction from the headend controller to the set of one or more cable modems;

sending by the headend controller, grants to the cable modems, wherein the grants include direct grants, contention grants, or null grants;

sending of data upstream by the cable modems in response to the grants.

26. The method of claim 25, wherein a virtual path identifier of the ATM cell corresponds to the unique identifier associated with a specific cable modem.

27. The method of claim 25, wherein a virtual path identifier of the ATM cell corresponds to the unique identifier associated with a subset of cable modems on a downstream channel.

28. The method of claim 25, wherein a virtual path identifier of the ATM cell corresponds to the unique identifier associated with each cable modem on a downstream channel.

29. A method of, data communication between a headend controller coupled to a plurality of cable modems, comprising the steps of:

establishing by the headend controller, a set of one or more virtual connections between the headend controller and a set of one or more cable modems;

sending an ATM cell by the headend controller through a cable network to the plurality of cable modems;

the set of one or more cable modems receiving the ATM cell associated with a specific virtual connection;

establishing a virtual connection to distribute grant instruction from the headend controller to the set of one or more cable modems;

sending by the headend controller, grants to the cable modems;

sending of data upstream by the cable modems in response to the grants, wherein each cable modem sharing a slotted upstream channel and a channel access mechanism employs a repeating integer counting range and the cable modems share a same starting inter and the integer value on which to begin a repeat count.

30. The method of claim 29, wherein the headend controller issues grants to cable modems such that a mixture of constant bit rate and variable bit rate service allocations are scheduled on a same upstream channel.

* * * * *